(12) United States Patent
Fan et al.

(10) Patent No.: US 10,010,847 B2
(45) Date of Patent: Jul. 3, 2018

(54) CIRCULATING FLUIDIZED BED WITH MOVING BED DOWNCOMERS AND GAS SEALING BETWEEN REACTORS

(75) Inventors: Liang-Shih Fan, Columbus, OH (US); Fanxing Li, Cary, NC (US); Fei Wang, Columbus, OH (US); Andrew S. Tong, Massillon, OH (US); Surya B. R. Karri, Naperville, IL (US); John G. Findlay, Homer Glen, IL (US); Ted M. Knowlton, Willowbrook, IL (US); Raymond A. Cocco, Elmhurst, IL (US)

(73) Assignee: Ohio State Innovation Foundation, Columbus, OH (US)

( * ) Notice: Subject to any disclaimer, the term of this patent is extended or adjusted under 35 U.S.C. 154(b) by 1050 days.

(21) Appl. No.: 13/883,795

(22) PCT Filed: Nov. 8, 2011

(86) PCT No.: PCT/US2011/059736
§ 371 (c)(1),
(2), (4) Date: Oct. 22, 2013

(87) PCT Pub. No.: WO2012/064712
PCT Pub. Date: May 18, 2012

(65) Prior Publication Data
US 2014/0034134 A1    Feb. 6, 2014

Related U.S. Application Data

(60) Provisional application No. 61/411,128, filed on Nov. 8, 2010.

(51) Int. Cl.
*B01J 8/08* (2006.01)
*B01J 8/12* (2006.01)
(Continued)

(52) U.S. Cl.
CPC ............. *B01J 8/26* (2013.01); *B01J 8/006* (2013.01); *B01J 8/0055* (2013.01); *B01J 8/087* (2013.01);
(Continued)

(58) Field of Classification Search
CPC ......... B01J 8/08; B01J 8/00; B01J 8/12; B01J 8/18; B01J 8/28; B01J 8/38; C01B 3/06; C01B 3/10
(Continued)

(56) References Cited

U.S. PATENT DOCUMENTS

| | | |
|---|---|---|
| 971,206 A | 9/1910 | Messerschmitt |
| 1,078,686 A | 11/1913 | Lane |

(Continued)

FOREIGN PATENT DOCUMENTS

| | | |
|---|---|---|
| CN | 1329761 | 1/2001 |
| CN | 1454711 | 10/2003 |

(Continued)

OTHER PUBLICATIONS

International Search Report and Written Opinion for Application No. PCT/US14/14877 dated May 14, 2014 (10 pages).

(Continued)

*Primary Examiner* — Huy-Tram Nguyen
(74) *Attorney, Agent, or Firm* — Michael Best & Friedrich LLP

(57) ABSTRACT

A system and process for carrying out one or more chemical reactions are provided and include one or more chemical reactors having particulate solids forming a bed therein, and a gas stripping zone forming a non-mechanical seal between said reactors which includes a conduit connecting the reactors. The conduit includes an inlet for a stripping gas which
(Continued)

is adapted to prevent process gas from passing between reactors while permitting particulate solids to pass between reactors.

13 Claims, 14 Drawing Sheets

(51) Int. Cl.
| | |
|---|---|
| *B01J 8/26* | (2006.01) |
| *B01J 8/00* | (2006.01) |
| *B01J 8/18* | (2006.01) |
| *B01J 8/28* | (2006.01) |
| *B01J 8/38* | (2006.01) |
| *C01B 3/06* | (2006.01) |
| *C01B 3/10* | (2006.01) |

(52) U.S. Cl.
CPC ............. *B01J 8/125* (2013.01); *B01J 8/1836* (2013.01); *B01J 8/1872* (2013.01); *B01J 8/28* (2013.01); *B01J 8/388* (2013.01); *C01B 3/063* (2013.01); *C01B 3/105* (2013.01); *B01J 2208/0061* (2013.01); *B01J 2208/0084* (2013.01); *B01J 2208/00389* (2013.01); *B01J 2208/00495* (2013.01); *B01J 2208/00504* (2013.01); *B01J 2208/00539* (2013.01); *B01J 2208/00548* (2013.01); *Y02E 60/36* (2013.01); *Y10T 137/0318* (2015.04)

(58) Field of Classification Search
USPC ....... 422/129, 139, 187, 211, 600, 620, 630, 422/631; 501/1; 502/100, 300
See application file for complete search history.

(56) References Cited

U.S. PATENT DOCUMENTS

| | | | |
|---|---|---|---|
| 1,658,939 | A | 2/1928 | Parsons |
| 2,182,747 | A | 12/1939 | Marshall, Jr. |
| 2,198,560 | A | 4/1940 | Marshall, Jr. |
| 2,449,635 | A | 9/1948 | Barr |
| 2,614,067 | A | 10/1952 | Reed et al. |
| 2,635,947 | A | 4/1953 | Reed et al. |
| 2,686,819 | A | 8/1954 | Johnson |
| 2,694,622 | A | 11/1954 | Reed et al. |
| 2,697,686 | A | 12/1954 | Leffer |
| 2,899,374 | A | 8/1959 | Gomory |
| 3,027,238 | A | 3/1962 | Watkins |
| 3,031,287 | A | 4/1962 | Benson et al. |
| 3,338,667 | A | 8/1967 | Pundsack |
| 3,353,925 | A | 11/1967 | Baumann et al. |
| 3,421,869 | A | 1/1969 | Benson |
| 3,442,613 | A | 5/1969 | Grotz, Jr. |
| 3,442,619 | A | 5/1969 | Huebler et al. |
| 3,442,620 | A | 5/1969 | Huebler et al. |
| 3,494,858 | A | 2/1970 | Luckenbach |
| 3,523,821 | A | 8/1970 | Bryce et al. |
| 3,573,224 | A | 3/1971 | Strelzoff et al. |
| 3,619,142 | A | 11/1971 | Johnson et al. |
| 3,726,966 | A | 4/1973 | Johnston |
| 4,017,270 | A | 4/1977 | Funk et al. |
| 4,057,402 | A | 11/1977 | Patel et al. |
| 4,108,732 | A | 8/1978 | Nuttall, Jr. |
| 4,272,399 | A | 6/1981 | Davis et al. |
| 4,325,833 | A | 4/1982 | Scott |
| 4,334,959 | A | 6/1982 | Green |
| 4,343,624 | A | 8/1982 | Belke et al. |
| 4,348,487 | A | 9/1982 | Goldstein et al. |
| 4,404,086 | A | 9/1983 | Oltrogge |
| 4,420,332 | A | 12/1983 | Mori et al. |
| 4,521,117 | A | 6/1985 | Ouwerkerk et al. |
| 4,778,585 | A | 10/1988 | Graff |
| 4,842,777 | A | 6/1989 | Lamort |
| 4,861,165 | A | 8/1989 | Fredriksson et al. |
| 4,869,207 | A | 9/1989 | Engstrom et al. |
| 4,902,586 | A | 2/1990 | Wertheim |
| 4,895,821 | A | 6/1990 | Kainer et al. |
| 5,130,106 | A | 7/1992 | Koves et al. |
| 5,365,560 | A | 11/1994 | Tam |
| 5,447,024 | A | 9/1995 | Ishida et al. |
| 5,509,362 | A | 4/1996 | Lyon |
| 5,518,187 | A | 5/1996 | Bruno et al. |
| 5,529,599 | A | 6/1996 | Calderon |
| 5,630,368 | A | 5/1997 | Wagoner |
| 5,730,763 | A | 3/1998 | Manulescu et al. |
| 5,770,310 | A | 6/1998 | Noguchi et al. |
| 5,827,496 | A | 10/1998 | Lyon |
| 5,858,210 | A | 1/1999 | Richardson |
| 6,007,699 | A | 12/1999 | Cole |
| 6,143,203 | A | 11/2000 | Zeng et al. |
| 6,143,253 | A | 11/2000 | Radcliffe et al. |
| 6,180,354 | B1 | 1/2001 | Singh et al. |
| 6,187,465 | B1 | 2/2001 | Galloway |
| 6,361,757 | B1 | 3/2002 | Shikada et al. |
| 6,395,944 | B1 | 5/2002 | Griffiths |
| 6,412,559 | B1 | 7/2002 | Gunter et al. |
| 6,444,712 | B1 | 9/2002 | Janda |
| 6,494,153 | B1 | 12/2002 | Lyon |
| 6,509,000 | B1 | 1/2003 | Choudhary et al. |
| 6,517,631 | B1 | 2/2003 | Bland |
| 6,631,698 | B1 * | 10/2003 | Hyppanen ........... F22B 31/0084 110/347 |
| 6,642,174 | B2 | 11/2003 | Gaffney et al. |
| 6,663,681 | B2 | 12/2003 | Kindig et al. |
| 6,667,022 | B2 | 12/2003 | Cole |
| 6,669,917 | B2 | 12/2003 | Lyon |
| 6,682,714 | B2 | 1/2004 | Kindig et al. |
| 6,685,754 | B2 | 2/2004 | Kindig et al. |
| 6,703,343 | B2 | 3/2004 | Park |
| 6,797,253 | B2 | 9/2004 | Lyon |
| 6,834,623 | B2 | 12/2004 | Cheng |
| 6,875,411 | B2 | 4/2005 | Sanfilippo et al. |
| 6,880,635 | B2 | 4/2005 | Vinegar et al. |
| 6,936,363 | B2 | 8/2005 | Kordesch et al. |
| 7,001,579 | B2 | 2/2006 | Metzger et al. |
| 7,244,399 | B2 | 7/2007 | Myohanen et al. |
| 7,404,942 | B2 | 7/2008 | Sanfilippo et al. |
| 7,496,450 | B2 | 2/2009 | Ortiz Aleman et al. |
| 7,749,626 | B2 | 7/2010 | Take |
| 7,767,191 | B2 | 8/2010 | Thomas et al. |
| 7,837,975 | B2 | 11/2010 | Iyer et al. |
| 7,840,053 | B2 | 11/2010 | Liao |
| 8,116,430 | B1 | 2/2012 | Shapiro et al. |
| 8,192,706 | B2 | 6/2012 | Grochowski |
| 8,202,349 | B2 | 6/2012 | Molaison |
| 8,419,813 | B2 | 4/2013 | Hoteit et al. |
| 8,435,920 | B2 | 5/2013 | White et al. |
| 8,508,238 | B2 | 8/2013 | Mahalingam et al. |
| 8,761,943 | B2 | 6/2014 | Lou et al. |
| 8,771,549 | B2 | 7/2014 | Gauthier et al. |
| 8,814,963 | B2 | 8/2014 | Apanel et al. |
| 8,877,147 | B2 * | 11/2014 | Fan ........................... C10J 3/12 422/129 |
| 9,376,318 | B2 | 6/2016 | Fan et al. |
| 9,616,403 | B2 | 4/2017 | Fan et al. |
| 2001/0055559 | A1 | 12/2001 | Sanfilippo et al. |
| 2002/0011428 | A1 | 1/2002 | Scheuerman |
| 2002/0179887 | A1 | 12/2002 | Zeng et al. |
| 2003/0006026 | A1 | 1/2003 | Matsumoto et al. |
| 2003/0024388 | A1 | 2/2003 | Scharpf |
| 2003/0031291 | A1 | 2/2003 | Yamamoto et al. |
| 2003/0119658 | A1 | 6/2003 | Allison et al. |
| 2003/0130360 | A1 | 7/2003 | Kindig et al. |
| 2003/0180215 | A1 | 9/2003 | Niu et al. |
| 2003/0188668 | A1 | 10/2003 | Bland |
| 2004/0028181 | A1 | 2/2004 | Charles, Jr. et al. |
| 2004/0030214 | A1 | 2/2004 | Schindler et al. |
| 2004/0109800 | A1 | 6/2004 | Pahlman et al. |
| 2004/0126293 | A1 | 7/2004 | Geerlings et al. |
| 2004/0131531 | A1 | 7/2004 | Geerlings et al. |
| 2004/0132833 | A1 | 7/2004 | Espinoza et al. |
| 2004/0138060 | A1 | 7/2004 | Rapier et al. |

(56) References Cited

U.S. PATENT DOCUMENTS

| | | |
|---|---|---|
| 2004/0152790 A1 | 8/2004 | Camaro et al. |
| 2004/0154223 A1 | 8/2004 | Powell et al. |
| 2004/0197612 A1 | 10/2004 | Keefer et al. |
| 2004/0213705 A1 | 10/2004 | Blencoe et al. |
| 2004/0233191 A1 | 11/2004 | Mukherjee et al. |
| 2004/0244289 A1 | 12/2004 | Morozumi et al. |
| 2004/0265224 A1 | 12/2004 | Papavassiliou et al. |
| 2005/0002847 A1 | 1/2005 | Maroto-Valer et al. |
| 2005/0054880 A1 | 3/2005 | Dubois et al. |
| 2005/0175533 A1 | 8/2005 | Thomas et al. |
| 2005/0255037 A1 | 11/2005 | Otsuka et al. |
| 2005/0265912 A1 | 12/2005 | Alvarez, Jr. et al. |
| 2005/0274648 A1 | 12/2005 | Goldstein et al. |
| 2006/0021308 A1 | 2/2006 | Merkel |
| 2006/0042565 A1 | 3/2006 | Hu |
| 2006/0094593 A1 | 5/2006 | Beech, Jr. et al. |
| 2007/0010588 A1 | 1/2007 | Pearson |
| 2007/0049489 A1 | 3/2007 | Becue et al. |
| 2007/0157517 A1 | 7/2007 | Tsay et al. |
| 2007/0258878 A1 | 11/2007 | Sanfilippo et al. |
| 2008/0031809 A1 | 2/2008 | Norbeck et al. |
| 2008/0161624 A1 | 7/2008 | Glover et al. |
| 2008/0164443 A1 | 7/2008 | White et al. |
| 2008/0209807 A1 | 9/2008 | Tsangaris et al. |
| 2008/0314838 A1* | 12/2008 | Becker ................. B07B 4/08 210/718 |
| 2009/0000194 A1 | 1/2009 | Fan et al. |
| 2009/0042070 A1 | 2/2009 | Brown et al. |
| 2010/0071262 A1 | 3/2010 | Robinson et al. |
| 2010/0184589 A1 | 7/2010 | Miyairi et al. |
| 2010/0187159 A1 | 7/2010 | Naunheimer |
| 2010/0258429 A1 | 10/2010 | Ugolin |
| 2010/0293845 A1 | 11/2010 | Zeman et al. |
| 2010/0332170 A1 | 12/2010 | Gao et al. |
| 2011/0005395 A1 | 1/2011 | Vimalchand et al. |
| 2011/0011720 A1 | 1/2011 | Rinker |
| 2011/0024687 A1 | 2/2011 | White et al. |
| 2011/0054049 A1 | 3/2011 | Lambert et al. |
| 2011/0094226 A1 | 4/2011 | McHugh et al. |
| 2011/0100274 A1 | 5/2011 | Kuske et al. |
| 2011/0146152 A1 | 6/2011 | Vimalchand et al. |
| 2011/0176968 A1 | 7/2011 | Fan et al. |
| 2011/0176988 A1 | 7/2011 | Okamura et al. |
| 2011/0206469 A1 | 8/2011 | Furuyama et al. |
| 2011/0289845 A1 | 12/2011 | Davis et al. |
| 2011/0291051 A1 | 12/2011 | Hershkowitz et al. |
| 2011/0300060 A1 | 12/2011 | Guillou et al. |
| 2011/0303875 A1 | 12/2011 | Hoteit et al. |
| 2012/0159841 A1 | 6/2012 | Fan et al. |
| 2012/0167585 A1 | 7/2012 | Wormser |
| 2012/0171588 A1 | 7/2012 | Fan et al. |
| 2012/0214106 A1 | 8/2012 | Sit et al. |
| 2013/0149650 A1 | 6/2013 | Gauthier et al. |
| 2013/0085365 A1 | 10/2013 | Marashdeh et al. |
| 2013/0255272 A1 | 10/2013 | Ajhar et al. |
| 2014/0034134 A1 | 2/2014 | Fan et al. |
| 2014/0072917 A1 | 3/2014 | Fan et al. |
| 2014/0144082 A1 | 5/2014 | Fan et al. |
| 2014/0275297 A1 | 9/2014 | Velazquez-Vargas et al. |
| 2014/0295361 A1 | 10/2014 | Fan et al. |
| 2015/0238915 A1 | 8/2015 | Fan et al. |
| 2016/0002034 A1 | 1/2016 | Fan et al. |
| 2016/0023190 A1 | 1/2016 | Fan et al. |
| 2016/0030904 A1 | 2/2016 | Fan et al. |
| 2016/0268616 A1 | 9/2016 | Fan et al. |
| 2016/0376512 A1 | 12/2016 | Fan et al. |

FOREIGN PATENT DOCUMENTS

| | | |
|---|---|---|
| CN | 1501534 | 6/2004 |
| CN | 101389734 A | 3/2009 |
| CN | 101426885 A | 5/2009 |
| CN | 102187153 | 9/2011 |
| CN | 102612625 | 7/2012 |
| EP | 0161970 | 11/1985 |
| EP | 1134187 A2 | 9/2001 |
| EP | 1138096 A1 | 10/2001 |
| EP | 1445018 A1 | 8/2004 |
| EP | 1580162 A2 | 9/2005 |
| EP | 1845579 A2 | 10/2007 |
| EP | 1933087 | 6/2008 |
| EP | 2450420 | 5/2012 |
| EP | 2515038 | 10/2012 |
| EP | 2601443 | 6/2013 |
| FR | 2924035 | 5/2009 |
| JP | H10249153 A | 9/1998 |
| JP | 2006-502957 | 1/2006 |
| TW | 406055 B | 9/2000 |
| TW | 426728 B | 3/2001 |
| WO | WO 1990/13773 | 11/1990 |
| WO | 1999065097 A1 | 12/1999 |
| WO | 200022690 A1 | 4/2000 |
| WO | WO 2000/068339 | 11/2000 |
| WO | 2001042132 A1 | 6/2001 |
| WO | WO 2003/070629 | 8/2003 |
| WO | 2007082089 A2 | 7/2007 |
| WO | 2007122498 A2 | 11/2007 |
| WO | WO 2007/134075 | 11/2007 |
| WO | 2008019079 A2 | 2/2008 |
| WO | 2008/071215 | 6/2008 |
| WO | 2008082312 A1 | 7/2008 |
| WO | WO 2008082312 A1 * | 7/2008 ................ B01J 8/28 |
| WO | WO 2008/115076 | 9/2008 |
| WO | WO 2009/007200 | 1/2009 |
| WO | WO 2009/009388 | 1/2009 |
| WO | 2009021258 A1 | 2/2009 |
| WO | WO 2009/114309 | 9/2009 |
| WO | 2010037011 A2 | 4/2010 |
| WO | 2010063923 A2 | 6/2010 |
| WO | WO 2010/126617 | 11/2010 |
| WO | WO 2011/021161 | 2/2011 |
| WO | WO 2011/031752 | 3/2011 |
| WO | WO 2011/031755 | 3/2011 |
| WO | 2011/084734 | 7/2011 |
| WO | WO 2012/064712 | 5/2012 |
| WO | WO 2012/077978 | 6/2012 |
| WO | WO 2012/155054 | 11/2012 |
| WO | WO 2012/155059 | 11/2012 |
| WO | WO 2013/040645 | 3/2013 |
| WO | WO 2014/085243 | 6/2014 |
| WO | 2011/153568 | 12/2014 |
| WO | 2014/195904 | 12/2014 |
| WO | 2016/053941 | 4/2016 |

OTHER PUBLICATIONS

International Search Report and Written Opinion for Application No. PCT/US14/25520 dated Jul. 11, 2014 (13 pages).

International Search Report and Written Opinion for Application No. PCT/US14/26071 dated Jul. 10, 2014 (9 pages).

International Search Report and Written Opinion for Application No. PCT/US2014/027839 dated Jul. 24, 2014 (9 pages).

International Search Report and Written Opinion for Application No. PCT/US2014/028217 dated Jul. 28, 2014 (8 pages).

International Search Report and Written Opinion for Application No. PCT/US2015/018123 dated May 8, 2015 (10 pages).

Chinese Patent Office Action for Application No. 201180061673.2 dated Nov. 14, 2014 (7 pages—English translated included).

Chinese Patent Office Action for Application No. 201080048130.2 dated Jul. 24, 2014 (6 pages, English translation only).

Chinese Patent Office Action for Application No. 201080048130.2 dated Mar. 13, 2015 (4 pages, English translation only).

Chinese Patent Office Action for Application No. 201080048173.0 dated Sep. 2, 2014 (3 pages, English translation only).

Chinese Patent Office Action for Application No. 201080048173.0 dated Jan. 16, 2015 (14 pages, English translation included).

United States Patent Office Action for U.S. Appl. No. 13/394,572 dated Apr. 9, 2014 (26 pages).

United States Patent Office Action for U.S. Appl. No. 13/394,572 dated Aug. 26, 2014 (16 pages).

(56) References Cited

OTHER PUBLICATIONS

United States Patent Office Action for U.S. Appl. No. 13/394,572 dated Dec. 30, 2014 (19 pages).
United States Patent Office Action for U.S. Appl. No. 13/394,396 dated Dec. 18, 2014 (14 pages).
United States Patent Office Final Rejection for U.S. Appl. No. 13/394,396 dated Jul. 2, 2015 (15 pages).
United States Patent Office Action for U.S. Appl. No. 14/091,654 dated Oct. 30, 2014 (14 pages).
United States Patent Office Action for U.S. Appl. No. 14/091,654 dated Jun. 12, 2015 (16 pages).
United States Patent Office Notice of Allowance for U.S. Appl. No. 14/504,295 dated Sep. 28, 2015 (10 pages).
United States Patent Office Notice of Allowance for U.S. Appl. No. 13/394,572 dated Dec. 14, 2015 (10 pages).
United States Patent Office Action for U.S. Appl. No. 12/160,803 dated Feb. 23, 2016 (27 pages).
United States Patent Office Action for U.S. Appl. No. 13/394,396 dated Jan. 15, 2016 (13 pages).
United States Patent Office Action for U.S. Appl. No. 13/394,572 dated Oct. 13, 2015 (21 pages).
United States Patent Office Notice of Allowance for U.S. Appl. No. 13/394,572 dated Feb. 22, 2016 (8 pages).
United States Patent Office Action for U.S. Appl. No. 14/091,654 dated Jan. 4, 2016 (17 pages).
Abad et al., "Chemical-looping combustion in a 300 W continuously operating reactor system using a manganese-based oxygen carrier," Fuel, 2006, vol. 85, Issue 9, pp. 1174-1185.
Abad et al., "Reduction Kinetics of Cu-, Ni-, and Fe- Based Oxygen Carriers Using Syngas (Co + H2) for Chemical-Looping Combustion," Energy Fuels, 2007, 21 (4), pp. 1843-1853.
Abad et al., "The use of iron oxide as oxygen carrier in a chemical-looping reactor," Fuel, 2007, vol. 86, Issues 7-8, pp. 1021-1035.
Adanez et al., "Progress in Chemical-Looping Combustion and Reforming technologies," Progress in Energy and Combustion Science, 2012, vol. 38, Issue 2, pp. 215-282.
Azis et al., "On the evaluation of synthetic and natural ilmenite using syngas as fuel in chemical-looping combustion (CLC)," Chemical Engineering Research and Design, 2010, vol. 88, Issue 11, pp. 1505-1514.
Balasubramanian et al., "Hydrogen from methane in a single-step process," Chem Engr Science, 1999, 54(15-16), 3543.
Cao et al., "Investigation of Chemical Looping Combustion by Solid Fuels. 1. Process Analysis," Energy Fuels, 2006, 20(5), pp. 1836-1844.
De Diego et al., "Development of Cu-based oxygen carriers for chemical-looping combustion," Fuel, 2004, vol. 83, Issue 13, pp. 1749-1757.
Denton et al., "Simultaneous Production of High-Purity Hydrogen and Sequestration-Ready CO2 from Syngas," 2003.
Fan et al., "Chemical looping processes for CO2 capture and carbonaceous fuel conversion prospect and opportunity," Energy Environmental Science, 2012, p. 7254-7280.
Forero et al., "Syngas combustion in a 500 Wth Chemical-Looping Combustion system using an impregnated Cu-based oxygen carrier," Fuel Processing Technology, 2009, vol. 90, Issue 12, pp. 1471-1479.
Gao et al., "Production of syngas via autothermal reforming of methane in a fluidized-bed reactor over the combined $CeO_2$—$ZrO_2$/$SiO_2$ supported Ni catalysts," International Journal of Hydrogen Energy, 2008, vol. 33, p. 5493-5500.
Garcia-Labiano et al., "Temperature variations in the oxygen carrier particles during their reduction and oxidation in a chemical-looping combustion system," Chemical Engineering Science, 2005, vol. 60, No. 3, pp. 851-862.
Ghanapragasam et al., "Hydrogen production from coal direct chemical looping and syngas chemical looping combustion systems: Assessment of system operation and resource requirements," International Journal of Hydrogen Energy, 2009, vol. 34, Issue 6, pp. 2606-2615.
Go et al., "Hydrogen production from two-step steam methane reforming in a fluidized bed reactor," International Journal of Hydrogen Energy, 2009, vol. 34, p. 1301-1309.
Hua et al., "Three Dimensional Analysis of Electrical Capacitance Tomography Sensing Fields," 1999 IOP Publishing LTD, vol. 10, pp. 717-725.
Johansson et al., "Combustion of Syngas and Natural Gas in a 300 W Chemical-Looping Combustor," Chemical Engineering Research and Design Volume, 2006, vol. 84, Issue 9, pp. 819-827.
Leion et al., "Solid fuels in chemical-looping combustion using oxide scale and unprocessed iron ore as oxygen carriers," Fuel, 2009, vol. 88, Issue 10, pp. 1945-1954.
Leion et al., "Solid fuels in chemical-looping combustion," International Journal of Greenhouse Gas Control, 2008, vol. 2, Issue 2, pp. 180-193.
Leion et al., "The use of petroleum coke as fuel in chemical-looping combustion," Fuel, 2007, vol. 86, Issue 12-13, pp. 1947-1958.
Li et al., "Role of Metal Oxide Support in Redox Reactions of Iron Oxide for Chemical Looping Applications: Experiments and Density Functional Theory Calculations," Energy Environmental Science, 2011, vol. 4, p. 3661-3667.
Li et al., "Syngas chemical looping gasification process: Bench-scale studies and reactor simulations," AICHE Journal, 2010, vol. 56, Issue 8, pp. 2186-2199.
Li et al., "Syngas Chemical Looping Gasification Process: Oxygen Carrier Particle Selection and Performance," Energy Fuels, 2009, 23(8), pp. 4182-4189.
Lyngfelt, "Chemical Looping Combustion of Solid Fuels—Status of Development," Applied Energy, 2014, vol. 113, p. 1869-1873.
Lyngfelt, "Oxygen Carriers for Chemical Looping Combustion Operational Experience," 1st International Conference on Chemical Looping, Mar. 2010.
Mamman et al., "Simultaneous steam and CO2 reforming of methane to syngas over NiO/MgO/SA-5205 in presence and absence of oxygen," Applied Catalysis A, 1998, vol. 168, p. 33-46.
Marashdeh, Q. et al., "A Multimodal Tomography System Based on ECT Sensors," IEEE Sensors Journal, vol. 7, No. 3, 2007, 426-433.
Marashdeh, Q., Advances in Electrical Capacitance Tomography, Dissertation, the Ohio State University, 2006.
Mattisson et al., "Chemical-looping combustion using syngas as fuel," International Journal of Greenhouse Gas control, 2007, vol. 1, Issue 2, pp. 158-169.
Mattisson et al., "Co 2 capture from coal combustion using chemical-looping combustion—Reactivity investigation of Fe, Ni and Mn based oxygen carriers using syngas," Department of Energy and Environment, Division of Energy Technology and Department of Chemical and Biological Engineering, Division of Environmental Inorganic Chemistry, Chalmers University of Technology, 2007.
Ortiz et al., "Hydrogen Production by Auto-Thermal Chemical-Looping Reforming in a Pressurized Fluidized Bed Reactor Using Ni-based Oxygen Carriers," International Journal of Hydrogen Energy, 2010, vol. 35, p. 151-160.
Pröll et al., "Syngas and a separate nitrogen/argon stream via chemical looping reforming—A 140 kW pilot plant study," Fuel, 2010, vol. 89, Issue 6, pp. 1249-1256.
Ruchenstein et al., "Carbon dioxide reforming of methane over nickel/alkaline earth metal oxide catalysts," Applied Catalysis A, 1995, vol. 133, p. 149-161.
Ryden et al., "Synthesis gas generation by chemical-looping reforming in a continuously operating laboratory reactor," Fuel, 2006, vol. 85, p. 1631-1641.
Scott et al., "In situ gasification of a solid fuel and CO2 separation using chemical looping," AICHE Journal, 2006, vol. 52, Issue 9, pp. 3325-3328.
Shen et al., "Experiments on chemical looping combustion of coal with a NiO based oxygen carrier," Combustion and Flame, 2009, vol. 156, Issue 3, pp. 721-728.
Sridhar et al., "Syngas Chemical Looping Process: Design and Construction of a 25 kWth Subpilot Unit," Energy Fuels, 2012, 26(4), pp. 2292-2302.

(56) References Cited

OTHER PUBLICATIONS

Tian et al., "Thermodynamic investigation into carbon deposition and sulfur evolution in a Ca-based chemical-looping combustion system," Chemical Engineering Research & Design, 2011, vol. 89, Issue 9, p. 1524.
Usachev et al., "Conversion of Hydrocarbons to Synthesis Gas: Problems and Prospects," Petroleum Chemistry, 2011, vol. 51, p. 96-106.
Warsito, W. et al., Electrical Capacitance Volume Tomography, 2007, pp. 1-9.
Yamazaki et al., "Development of highly stable nickel catalyst for methane-steam reaction under low steam to carbon ratio," Applied Catalyst A, 1996, vol. 136, p. 49-56.
Zafar et al., "Integrated Hydrogen and Power Production with CO2 Capture Using Chemical-Looping ReformingRedox Reactivity of Particles of CuO, Mn2O3, NiO, and Fe2O3 Using SiO2 as a Support," Ind. Eng. Chem. Res., 2005, 44(10), pp. 3485-3496.
Annual Project Report as of Dec. 2001.
Cho et al., "Comparison of iron-, nickel, copper- and manganese-based oxygen carriers for chemical-looping combustion", Fuel, vol. 83, pp. 1215-1225, 2004.
U.S. Department of Energy, NCCTI Energy Technologies Group, Office of Fossil Energy, "CO2 Capture and Storage in Geologic Formations", pp. 34, Revised Jan. 8, 2002.
Environmental Protection Agency, "Geological CO2 Sequestration Technology and Cost Analysis", Technical Support Document, pp. i-vi & pp. 1-61, Jun. 2008.
Geldart, "Types of Gas Fluidization", Powder Technology, vol. 7, pp. 285-292, 1973.
Haque, "Microwave energy for mineral treatment processes—a brief review", International Journal of Mineral Processing, vol. 57, pp. 1-24, 1999.
Hawley's Condensed Chemical Dictionary, entry for "ammonium bisulfate", John Wiley & Sons, Inc. 2002.
Hossain et al., "Chemical-looping combusion (CLC) for inherent CO2 separations—a review", Chemical Engineering Science, vol. 63, pp. 4433-4451; 2008.
Jin et al., "Development of a Novel Chemical-Looping Combustion: Synthesis of a Looping Material with a Double Metal Oxide of CoO-NiO", Energy & Fuels, vol. 12, pp. 1272-1277, 1998.
Huijgen et al., "Carbon dioxide sequestration by mineral carbonation", ECN-C—03-016, www.ecn.nl/docs/library/report/200e/c03016.pdf, Feb. 2003.
Jadhav et al., "Carbonation of Mg-Bearing Minerals: Kinetic and Mechanistic Studies", Ohio Coal Research Consortium/Ohio State University Project C3.12, www.ohiocoal.org/projects/year3/c3.12, Jul. 3, 2002.
Li et at., "Clean coal conversion processes—progress and challenges", The Royal Society of Chemistry, Energy & Environmental Science, vol. 1, pp. 248-267, Jul. 30, 2008.
Mattisson et al., "Applications of chemical-looping combustion with capture of CO2", Second Nordic Minisymposium on Carbon Dioxide Capture and Storate, Goeteborg, pp. 46-51, Oct. 26, 2001.
Mattisson et al., "Reactivity of Some Metal Oxides Supported on Alumina with Alternating Methane and Oxygen—Application for Chemical-Looping Combustion", energy & Fuels, vol. 17, pp. 643-651, 2003.
Mattisson et al., "The use of iron oxide as an oxygen carrier in chemical-looping combustion of methane with inherent separation of CO2", Fuel, vol. 80, pp. 1953-1962, 2001.
Mattisson et al., "Use of Ores and Industrial Products as Oxygen Carriers in Chemical-Looping Combustion", Energy & Fuels, vol. 23, pp. 2307-2315, 2009.
O'Connor et al., "Carbon Dioxide Sequestration by Direct Mineral Carbonation: Results from Recent Studies and Current Status", Abstract, USDOE Office of Fossil Energy, 2001.
Park et al., "CO2 Mineral Sequestration: Chemically Enhanced Aqueous Carbonation of Serpentine", The Canadian Journal of Chemical Engineering, vol. 81, pp. 885-890, Jun.-Aug. 2003.
Park et al., "CO2 Mineral Sequestration: physically activated dissolution of serpentine and pH swing process", Chemical Engineering Science, vol. 59, pp. 5241-5247, 2004.
Russo et al., "Impact of Process Design of on the Multiplicity Behavior of a Jacketed Exothermic CSTR", AIChE Journal, vol. 41, No. 1, pp. 135-147, Jan. 1995.
Shen et al, "Chemical-Looping Combustion of Biomass in a 10 kWth Reactor with Iron Oxide as an Oxygen Carrier", Energy & Fuels, vol. 23, pp. 2498-2505, 2009.
Steinfeld et al., "Design Aspects of Solar Thermochemical Engineering—A Case Study: Two-Step Water-Splitting Cycle Using the Fe3O4/FeO Redox System" Solar Energy, vol. 65, No. 1, pp. 43-53, 1999.
Steinfeld, "Solar hydrogen production via a two-step water-splitting thermochemical cycle based on Zn/ZnO redox reactions", International Journal of Hydrogen Energy, vol. 27, pp. 611-619, 2002.
Vernon et al., "Partial Oxidation of Methane to Synthesis Gas", Catalysis Letters, vol. 6, pp. 181-186, 1990.
International Search Report and Written Opinion for International Application PCT/US2010/048125 dated Dec. 17, 2010.
International Preliminary Report on Patentability for International Application PCT/US2010/048125 dated Mar. 22, 2012.
Office Action for Chinese Patent Application No. 201080048130.2 dated Nov. 13, 2013.
Herzog, "Carbon Sequestration via Mineral Carbonation: Overview and Assessment", MIT Laboratory for Energy and the Environment, http://sequestration.mit.edu/pdf/carbonates.pdf, Mar. 14, 2002.
Ohio Coal Development Office of the Ohio Air Quality Development Authority, "Ohio Coal Research Consortium (OCRC)—IV, Year 3 Proposals Solicitation", http://www.ohioairquality.org/ocdo/other_pdf/Consortium_IV_Year_3_RFP.pdf.
Fan et al., "Utilization of chemical looping strategy in coal gasification processes", Particuology, vol. 6, pp. 131-142, 2008.
Hildebrandt et al., "Producing Transportation Fuels with Less Work", Science, vol. 323, pp. 1680-1681, Mar. 27, 2009.
Kaiser et al., "Precombusion and Postcombustion Decarbonization", IEEE, Power Engineering Review, pp. 15-17, Apr. 2001.
Li et al., "Clean coal conversion process—progress and challenges", Energy & Environmental Science, vol. 1, pp. 248-267, Jul. 11, 2008.
Ockwig et al., "Membranes for Hydrogen Separation", American Chemical Society, Chem. Rev., vol. 107, pp. 4078-4110, Oct. 10, 2007.
European Search Report for Application No. 07716591.8 dated Mar. 6, 2012.
International Search Report and Written Opinion for International Application No. PCT/US2007/000956 dated Dec. 4, 2007.
International Preliminary Report on Patentability for International Application No. PCT/US2007/000956 dated Jul. 24, 2008.
International Search Report and Written Opinion for International Application No. PCT/US2009/058579 dated Aug. 3, 2010.
International Search Report and Written Opinion for International Application no. PCT/US2010/048121 dated Apr. 1, 2011.
International Preliminary Report on Patentability for International Application No. PCT/US2010/048121 dated Mar. 22, 2012.
International Search Report and Written Opinion for International Application No. PCT/US2012/37544 dated Aug. 10, 2012.
International Preliminary Report on Patentability for International Application No. PCT/US2012/037544 dated Nov. 12, 2013.
International Search Report and Written Opinion for International Application No. PCT/US2012/037557 dated Aug. 13, 2012.
International Preliminary Report on Patentability for International Application No. PCT/US2012/037557 dated Nov. 21, 2013.
Office Action pertaining to U.S. Appl. No. 12/160,803 dated Jun. 7, 2011.
Final Rejection pertaining to U.S. Appl. No. 12/160,803 dated Jan. 5, 2012.
Office Action pertaining to U.S. Appl. No. 12/160,803 dated Jun. 5, 2012.
Final Rejection pertaining to U.S. Appl. No. 12/160,803 dated Mar. 22, 2013.
Advisory Action pertaining to U.S. Appl. No. 12/160,803 dated Jul. 11, 2013.

(56) References Cited

OTHER PUBLICATIONS

Examiner's Answer before the Patent Trial and Appeal Board for U.S. Appl. No. 12/160,803 dated Nov. 4, 2013.
Office Action for Canadian Application No. 2636325 dated Dec. 5, 2012.
Office Action for Chinese Patent Application No. 200780006757.X dated Apr. 11, 2011.
Office Action for Chinese Patent Application No. 200780006757.X dated Dec. 8, 2011.
Office Action for Chinese Patent Application No. 200780006757.X dated Jul. 4, 2012.
Final Rejection for Chinese Patent Application No. 200780006757.X dated Feb. 1, 2013.
Office Action for Chinese Patent Application No. 201110226206.2 dated Sep. 5, 2012.
Office Action for Chinese Patent Application No. 201110226206.2 dated May 14, 2013.
Office Action for Chinese Patent Application No. 201110226206.2 dated Sep. 18, 2013.
Office Action pertaining to U.S. Appl. No. 13/121,009 dated Sep. 6, 2012.
Final Rejection pertaining to U.S. Appl. No. 13/121,009 dated Mar. 14, 2013.
Advisory Action pertaining to U.S. Appl. No. 13/121,009 dated Jun. 24, 2013.
Office Action pertaining to U.S. Appl. No. 13/121,009 dated Sep. 13, 2013.
Final Rejection pertaining to U.S. Appl. No. 13/121,009 dated Jan. 16, 2014.
Office Action for Taiwanese Patent Application No. 098132745 dated Aug. 7, 2013.
Office Action for Taiwanese Patent Application No. 098132745 dated Oct. 17, 2012.
Office Action for Chinese Patent Application No. 200980141285.8 dated Feb. 26, 2013.
Office Action for Chinese Patent Application No. 200980141285.8 dated Oct. 29, 2013.
Office Action for Chinese Patent Application No. 201080048173.0 dated Nov. 18, 2013.
Search Report pertaining to International Patent Application No. PCT/US2011/059736 dated Mar. 27, 2012.
Preliminary Report on Patentability pertaining to International Patent Application PCT/US2011/059736 dated May 23, 2013.
Adanez et al., "Selection of oxygen carriers for chemical-looping combustion," Energy & Fuels, American Chemical Society, 2004, vol. 18, No. 2, pp. 371-377.
Australian Patent Office Examination Report No. 1 for Application No. 2011326127 dated May 30, 2016 (3 pages).
United States Patent Office Action for U.S. Appl. No. 15/162,199 dated Jun. 30, 2016 (10 pages).
United States Patent Office Final Rejection for U.S. Appl. No. 15/162,199 dated Oct. 21, 2016 (9 pages).
United States Patent Office Notice of Allowance for U.S. Appl. No. 13/394,396 dated Aug. 3, 2016 (8 pages).
United States Patent Office Action for U.S. Appl. No. 14/116,627 dated Oct. 20, 2016 (6 pages).
United States Patent Office Notice of Allowance for U.S. Appl. No. 14/116,627 dated Mar. 10, 2017 (5 pages).
United States Patent Office Final Rejection for U.S. Appl. No. 14/116,636 dated Oct. 24, 2016 (10 pages).
United States Patent Office Action for U.S. Appl. No. 14/634,319 dated Nov. 7, 2016 (7 pages).
United States Patent Office Notice of Allowance for U.S. Appl. No. 14/774,730 dated Nov. 16, 2016 (10 pages).
United States Patent Office Action for U.S. Appl. No. 14/766,086 dated Jan. 13, 2017 (22 pages).
European Patent Office Action for Application No. 11785871.2 dated Feb. 2, 2017 (11 pages).
United States Patent Office Action for U.S. Appl. No. 14/634,319 dated Apr. 11, 2017 (9 pages).
United States Patent Office Notice of Allowance for U.S. Appl. No. 14/116,636 dated Nov. 7, 2017 (5 pages).
United States Patent Office Action for U.S. Appl. No. 14/774,727 dated Sep. 14, 2017 (10 pages).
Bell et al., "H2 Production via Ammonia Decomposition Using Non-Noble Metal Catalysts: A Review," Top Catal, 2016, 59, 1438-1457.
Cheng et al., "Carbon Dioxide Adsorption and Activation on Ceria (110)," J. Chem. Phys. 2013, 138, 014702.
Cheng et al., "Methane Adsorption and Dissociation on Iron Oxide Oxygen Carrier Role of Oxygen Vacancy," Phys. Chem. Chem. Phys. 2016, 18, 16423-16435.
Cheng et al., "Propagation of Olefin Metathesis to Propene on WO3 Catalysts: A Mechanistic and Kinetic Study," ACS Catal. 2015, 5, 59-72.
Connell et al., "Process Simulation of Iron-Based Chemical Looping Schemes with CO2 Capture for Hydrogen and Electricity Production from Coal," Presented at 29th Annual International Pittsburgh Coal Conference, Pittsburgh, PA, Oct. 15-18, 2012, pp. 1274-1281.
De Klerk, "Gas-to-Liquid Conversion." Natural Gas Conversion Technologies Workshop of ARPA-E. U.S. Department of Energy, Houston, TX. vol. 13 (2012).
EIA—Independent Statistics and Analysis. U.S. Department of Energy, U.S. Energy Information Administration "Annual Energy Outlook 2015 with Projections to 2040," Apr. 2015.
EIA—Independent Statistics and Analysis. U.S. Department of Energy, U.S. Energy Information Administration, "How Much Petroleum Does the United States Import and from Where?" <https://www.eia.gov/tools/faqs/faq.php?id=727&t=6> webpage available as early as Mar. 22, 2017.
EIA—Independent Statistics and Analysis. U.S. Department of Energy, U.S. Energy Information Administration, "Natural Gas Vented and Flared." <https://www.eia.gov/dnav/ng/NG_PROD_SUM_A_EPG0_VGV_MMCF_A.htm> webpage available as early as Feb. 29, 2016.
EIA—Independent Statistics and Analysis. U.S. Department of Energy, U.S. Energy Information Administration, "Natural Gas Weekly Update." <https://www.eia.gov/naturalgas/weekly/> webpage available as early as Dec. 4, 2011.
Fan et al., "Chemical-Looping Technology Platform," AIChE Journal, 61(1), 2-22 (2015).
Fan, "Chemical Looping Systems for Fossil Energy Conversions," Wiley-AIChE: Hoboken, NJ, U.S.A.; 2010.
Ishida et al., "Evaluation of a Chemical-Looping-Combustion Power-Generation System by Graphic Exergy Analysis," Energy, 12(2), 147-154 (1987).
Kathe et al., "Chemical Looping Gasification for Hydrogen Enhanced Syngas Production with in-situ CO2 Capture," United States Department of Energy, OSTI: 1185194, (2015).
Li et al., "Ionic Diffusion in the Oxidation of Iron-effect of Support and Its Implications to Chemical Looping Applications," Energy Environ. Sci. 2011, 4, 876-880.
Liu et al., "Enhanced Performance of Alkali Metal Doped Fe2O3 and Fe2O3/Al2O3 Composites as Oxygen Carrier Material in Chemical Looping Combustion," Energy Fuels. 2013, 27, 4977-4983.
Luo et al., "Shale Gas-to-Syngas Chemical Looping Process for Stable Shale Gas Conversion to High Purity Syngas with H2:CO Ratio of 2:1," Energy and Environmental Science, 7(12), 4104-4117, (2014).
Makepeace et. al., "Ammonia decomposition catalysis using non-stoichiometric lithium imide," Chem. Sci., 2015, 6, 3805.
Miller et al., "Toward Transformational Carbon Capture," AIChE Journal, 62, 1-10 (2016).
NETL, National Energy Technology Laboratory. U.S. Department of Energy, "Quality Guidelines for Energy System Studies—Specification for Selected Feedstocks." Jan. 2012.
Qin et al., "Evolution of Nanoscale Morphology in Single and Binary Metal Oxide Microparticles During Reduction and Oxidation Processes," J. Mater. Chem. A. 2014, 2, 17511-17520.

(56) References Cited

OTHER PUBLICATIONS

Qin et al., "Impact of 1% Lathanum Dopant on Carbonaceous Fuel Redox Reactions with an Iron-Based Oxygen Carrier in Chemical Looping Processes," ACS Energy Letters, 2017, 2, 70-74.

Qin et al., "Nanostructure Formation Mechanism and Ion Diffusion in Iron-Titanium Composite Materials with chemical Looping Redox Reactions," J. Mater. Chem. A. 2015, 3, 11302-11312.

Quin et al., "Improved Cyclic redox reactivity of lanthanum modified iron-based oxygen carriers in carbon monoxide xhemical looping combustion," Journal of Materials Chemistry A, 2017, 8 pages.

Yin et. al., "A mini-review on ammonia decomposition catalysts for on-site generation of hydrogen for fuel cell applications," Applied Catalysis A: General, 2004, 277, 1-9.

International Search Report and Written Opinion for Application No. PCT/US2017/027241 dated Jul. 10, 2017 (11 pages).

International Search Report and Written Opinion for Application No. PCT/US2017/034503 dated Aug. 15, 2017 (14 pages).

United States Patent Office Notice of Allowance for U.S. Appl. No. 14/116,627 dated Jun. 14, 2017 (5 pages).

United States Patent Office Action for U.S. Appl. No. 14/775,044 dated May 30, 2017 (15 pages).

Velazquez-Vargas et al., "Atmospheric Iron-based Coal Direct Chemical Looping (CDCL) Process for Power Generation", presented in Power-Gen International 2012, Orlando, FL, Dec. 11-13, 2012, BR-1892, 1-5.

United States Patent Office Action for U.S. Appl. No. 14/766,086 dated Sep. 7, 2017 (19 pages).

Canadian Patent Office Action for Application No. 2,816,800 dated Dec. 19, 2017 (5 pages).

United States Patent Office Action for U.S. Appl. No. 14/766,086 dated Jan. 2, 2018 (21 pages).

United States Patent Office Action for U.S. Appl. No. 15/191,249 dated Dec. 28, 2017 (14 pages).

United States Patent Office Action for U.S. Appl. No. 15/647,084 dated Dec. 26, 2017 (7 pages).

\* cited by examiner

CIRCULATING FLUIDIZED BED WITH MOVING BED DOWNCOMERS AND GAS SEALING BETWEEN REACTORS

This invention was made with government support under Grant No. DE-AR000017 awarded by the U.S. Department of Energy. The government has rights in the invention.

The present invention is generally directed to systems and methods for chemical processes that involve solids circulation. Non-mechanical solids transfer and gas partitioning devices are generally utilized to ensure proper solids circulation gas distributions. A differential pressure based gas stripping technique is generally utilized to generate gas seals and gas partitions between reactor sections and to measure global and local solids flow rates within the system.

A chemical process can involve multiple reactors or reaction zones with one or more solids interchanging among them. In the transfer of solids from one reactor section to another, undesired fluid (gas and/or liquid) mixing among the reactors can occur in the absence of flow restriction devices such as mechanical and/or non-mechanical valves. To prevent product dilution, contamination, and/or potentially more hazardous situations, it is often desired to minimize or eliminate the gas mixing between reactor sections while still allowing solids movement. The use of a differential pressure based non-mechanical gas-stripping device can be an effective and efficient means to prevent gas transfer between reactor sections. Generally, a neutral, non-reactive, or less-reactive gas is injected into this region to replace, or strip, the zone.

Mechanical solids transferring devices such as lock hoppers and air-lock rotary valves are susceptible to frequent maintenance at extreme operating conditions and grow exponentially expensive with scale up. The operation of mechanical valves in solids handling systems is a challenge due to valve erosion by solid particles, particle clogging and attrition, failure of gas sealing, etc. The non-mechanical valves use specific combinations of pipe configurations and aeration gas to control the solids circulation rate and prevent gas mixing between the reactor sections. The gas-stripping devices utilize gas injection to generate the gas seal through the interstitial space. The challenges for mechanical valves, such as valve erosion and particle attrition, are less significant for properly designed non-mechanical valves. With no moving parts within the reactor system, the process operation will be simplified and more reliable and scalable.

In chemical reactor systems similar to a circulating fluidized bed, the solids circulation and gas flows through the reactor sections are highly dependent on the pressure distribution within the system. The stripping gas injection into the interstitial sections on the downcomer side can assist in generating the proper pressure distribution for the desired solids circulation, processing gas flow rates, and gas seals between reactor sections. Additionally, the gas injection provides the system with flexibility to operate the process under multiple processing capacities and/or under fluctuating pressure situations as the stripping gas and the non-mechanical gas stripping device can be utilized to absorb the pressure changes within the system.

Non-mechanical gas stripping devices can be used in various chemical processes and systems such as circulating fluidized bed combustion, and can be specifically applied to chemical looping processes. Thomas et al., U.S. Pat. No. 7,767,191; Fan et al, PCT Application No. WO 2007/082089; and Fan et al., PCT Application No. WO 2010/037011 describe methods for producing hydrogen gas by the use of a chemical looping process in an oxidation and reduction reaction scheme with carbon-based reducing fuels and oxidizing gases, respectively. The non-mechanical system design is directly applicable to the chemical looping process.

Previous publications have discussed the use of gas stripping devices as well as solids transferring devices such as J-valves and L-valves. Knowlton et al. discussed the use of a pipe as a stripping device to prevent the gas mixing between a fluidized bed and the lift line. However, many of these studies were discussed independently with no intent to utilize the devices to generate gas seals, balance pressure, and control solids flow in the proposed process configuration, and there was no specific application to a chemical looping process. In addition, previous studies have never utilized multiple gas stripping devices in a series of reactors.

Accordingly, the need still exists for designs in which non-mechanical gas-stripping and solids transfer devices provide cost-effective means of operating an industrial solids circulation process.

Embodiments of the present invention address those needs. The pressure developed from the gas-stripping zones assists in allowing the process to be more robust against process fluctuations and parameter changes. Embodiments of the present invention provide systems and methods for circulating gaseous and solid materials through a series of reactors in an effective manner. In some embodiments, the systems and methods include the use of non-mechanical solids transfer devices and/or non-mechanical gas partitioning devices.

In accordance with one embodiment, a system for carrying out one or more chemical reactions is provided and comprises a first chemical reactor having an inlet and an outlet for particulate solids, with the particulate solids forming a bed in the first reactor. The outlet includes a transition zone which narrows the internal diameter of the first reactor. The first reactor also includes an inlet for a solid or gaseous reactant and an outlet for a process gas. A second chemical reactor having an inlet and an outlet for particulate solids is also provided, with the particulate solids forming a bed in the second reactor. The second reactor includes an inlet for a solid or gaseous reactant and an outlet for a process gas. A gas stripping zone forms a non-mechanical seal between the first and second reactors and comprises a conduit connecting the first reactor with the second reactor. The conduit includes a first end communicating with the outlet of the first chemical reactor and a second end communicating with the inlet of the second reactor, the conduit includes an inlet for a stripping gas located between the first and second ends. The gas stripping zone is adapted to prevent process gas from the first reactor from entering the second reactor while permitting the particulate solids to pass from the first reactor into the second reactor. In one embodiment, the gas stripping zone comprises a zone seal standpipe.

In other embodiments, the system includes a third chemical reactor communicating with the second chemical reactor, the third reactor having an inlet and an outlet for particulate solids, and with the particulate solids forming a bed in said the reactor. The system may also include a riser section communicating with the particulate solids outlet of the third reactor, with the riser section adapted to recirculate entrained solids to the first reactor. The third reactor further includes a source of gas.

The system may also include a solids recovery device communicating with the riser section. The solids recovery device may comprise a particulate separator for removing fine solid particulates from said system. The system may also include a solids inventory device adapted to contain particulate solid particles. The solids inventory device communicates with the solids recovery device for receiving recovered particulate solids and communicates with the first chemical reactor for supplying particulate solids to the first reactor.

In another embodiment, the system may also include a gas stripping zone between said solids inventory device and said first reactor. The gas stripping zone comprises a standpipe forming a transitional gas discharge device. The standpipe has an end communicating with the first reactor, the end including a gas outlet communicating with the outlet for process gas in the first reactor for discharging gas from the standpipe. The gas outlet in the standpipe may comprise, for example, a plurality of porous filters, straight slits, angled slits, and holes. The system may also include a fines discharge device positioned on the circumference of an inner wall of one or more of the reactors.

In another embodiment, the system may include a solids circulation control device positioned between the second and third reactors and adapted to control the circulation rate of the particulate solids and to prevent gas mixing between the second and third reactors. The solids circulation control device may comprise, for example, a non-mechanical seal device selected from a standpipe, a loop seal, a V-valve, an L-valve, a J-valve, and an H-valve. In a further embodiment, the system may include a solid particulate bed height monitoring device positioned in one or more of the reactors comprising a capacitance sensor.

Embodiments of the present invention also provide a process for circulating gaseous and solid materials through a series of chemical reactors comprising controlling the flow of solids and gases through each reactor such that process gases from one reactor are prevented from entering a different reactor while permitting solids to pass from one reactor to another by positioning a stripping gas zone having first and second ends between said reactors and injecting a stripping gas into the zone between the first and second ends such that the gas pressure where stripping gas is injected is greater than or equal to the pressure at either end of the stripping zone.

These and additional features and advantages provided by the embodiments of the present invention will be more fully understood in view of the following detailed description, the accompanying drawings, and the appended claims.

The following detailed description of specific embodiments of the present invention can be best understood when read in conjunction with the drawings enclosed herewith and where like elements are identified by like reference numbers in the several provided views.

Figure 11:
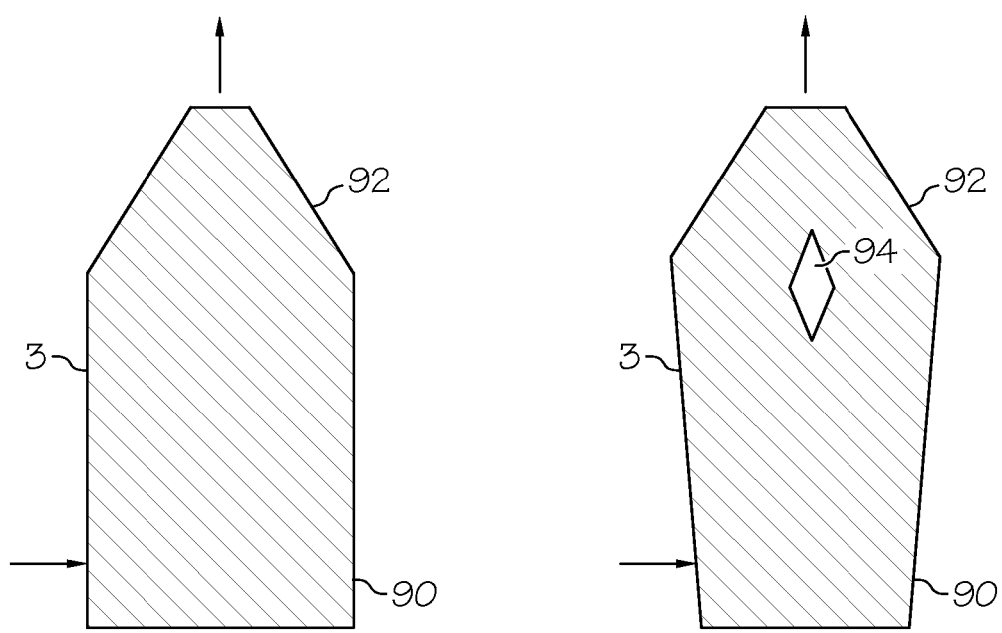
Figure 12:
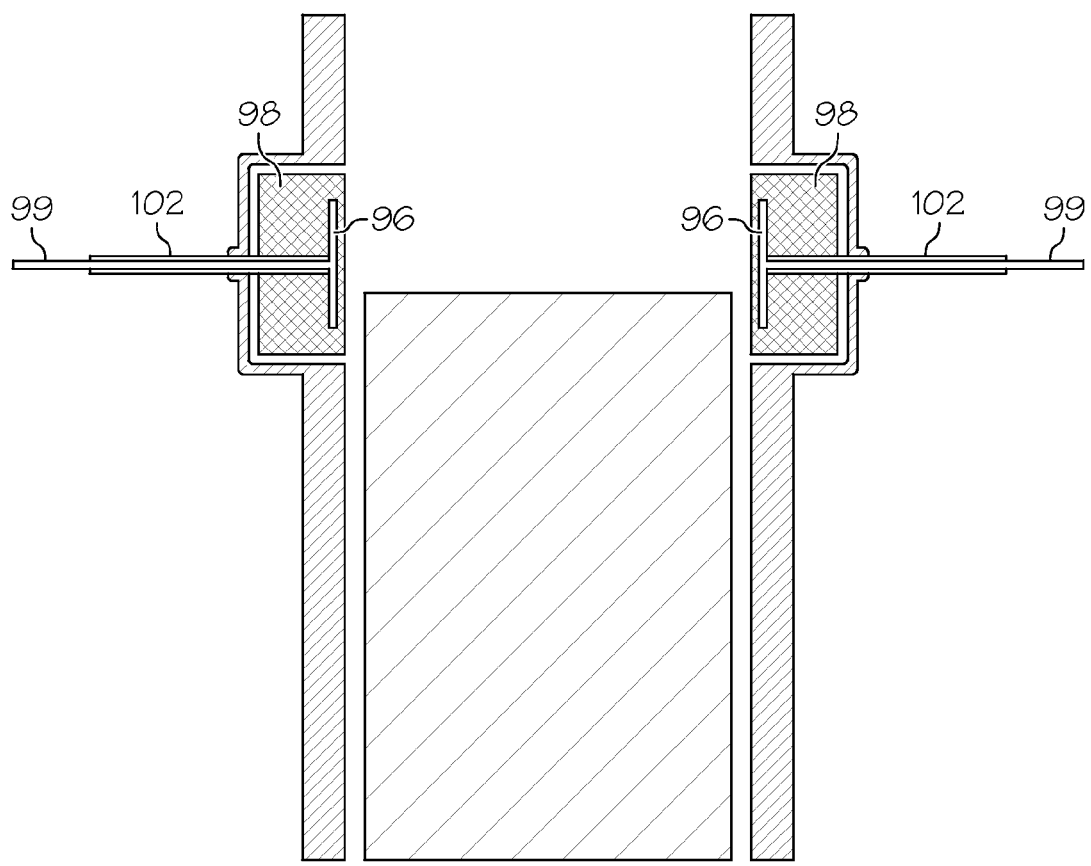
Figure 13:
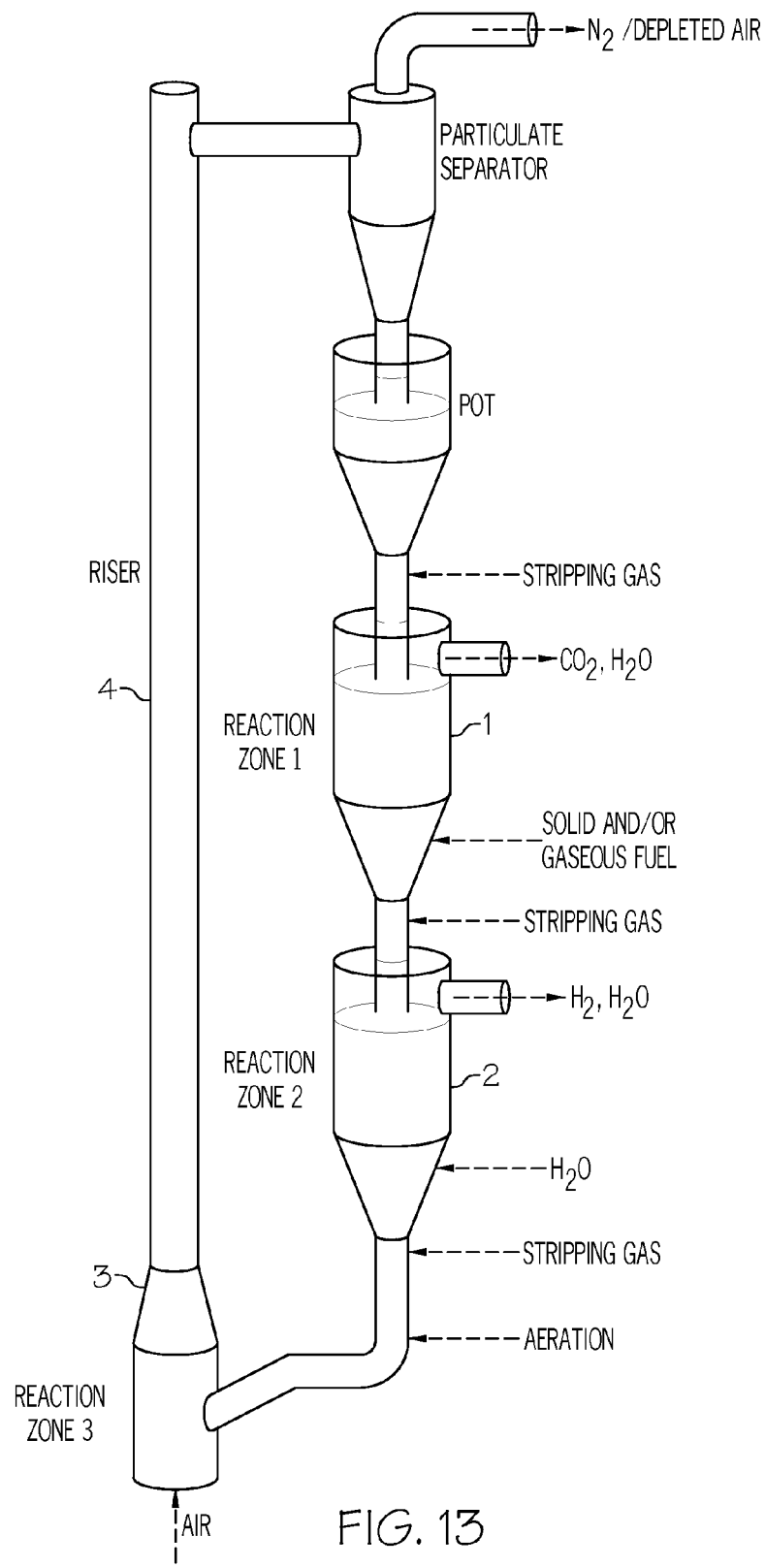

FIGS. 11(*a*) and 11(*b*) are schematic representations of alternative designs for the third chemical reactor in the system;

FIGS. 12(*a*) and 12(*b*) are schematic representations of a capacitance sensor suitable for use in the invention; and FIG. 13 is a schematic representation of an embodiment of the system for chemical looping applications.

Figure 1:
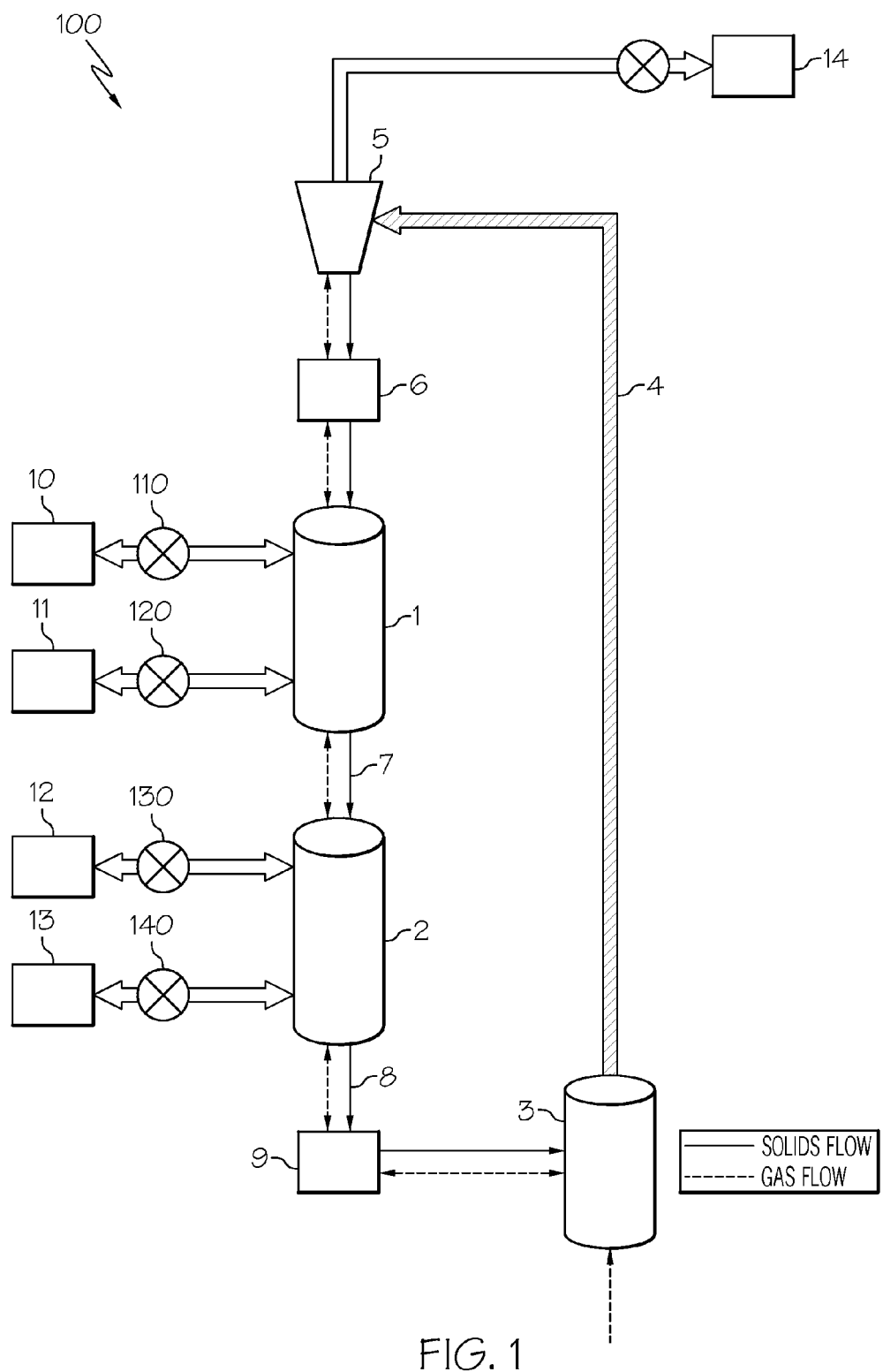
FIG. 1 is a schematic representation of one embodiment of the system.

Referring generally to FIG. 1, an embodiment of the invention is directed to a chemical processing system and method for non-mechanical solids circulation through multiple vessel sections connected in a manner similar to chemical looping processes which are described in the Thomas et al. and Fan et al. patents and published applications discussed above. As shown, the processing gas in each vessel is constrained to that section via the gas stripping zones. FIG. 1 schematically illustrates one embodiment of a system 100 configured so that gas-stripping zones 7, 8 are placed between each reactor 1, 2, and 3 with non-mechanical solids transferring and gas-solid separation devices 5, 6, and 9. Reactors 1 and 2 represent chemical reactors with at least one chemical reaction occurring in each reactor sections. FIG. 1 shows an example where only one global solids circulation control is applied. In other embodiments, additional solids circulation control devices can be built into the system such that solids are both locally and globally circulated within multiple solid circulation loops.

Gas stripping zones 7 and 8 can be part of any device that prevents the processing gas from each reactor section from entering the other while allowing the solids to pass through. Reactors 1 and 2 can be either a moving or fluidized bed design where the solids enter the top of each reactor section and exit through the bottom similar to a downcomer design. Ports 10 through 13 can be either inlets or outlets for gas flow such that reactors 1 and 2 operate as either co- or counter-current gas-solids flow devices. Solids circulation control device 9 is positioned such that an aeration gas is used to transfer solids from the left downcomer-like side to reactor 3. Reactor 3 is a fluidized bed, and the solids are transferred to the riser 4. The riser 4 entrains particulate solid media to a solids recovery device 5 where the solids are separated from the gas. Additionally, solids recovery device 5 may allow abraded solid fines below a specified size to pass with the entrainment gas flow removing the abraded particles from the system. The fines passing with the entrainment gas flow may be separated and collected from additional solids recovery devices positioned downstream of the entrainment gas for reuse. Any solid particles larger than a specified cutoff size are taken from solid recovery device 5 and pass through solids inventory and gas stripping zone device 6.

Ports 10 through 13 represent inlet and/or outlet gas lines for each reactor section, as these ports can be located anywhere along a respective reactor. In most cases, gas is distributed into the reactor system through ring spargers and/or multiple nozzles. Gas control devices such as, for example, valves 110-140 can be placed in each port to control both the gas flow through as well as the local pressure of the reactor system to ensure that a proper pressure balance is achieved. The gas control devices can be a type of proportional control valve, pressure regulation device, or a combination thereof. Port 14 is the gas outlet line from the riser and solids recovery device 5. In certain embodiments, the gas outlet streams on each reactor may contain abraded solid fines and may require a solids removal device to be used for each port affected. In certain embodiments, solids can be introduced and/or removed from the reactor sections along with the gas through respective inlets and/or outlets.

In certain embodiments, the solids circulation through the chemical process may have more or fewer reactor sections. In FIG. 1, reactor 2 and stripping gas zone 7 can be either repeated by adding more reactors connected in series via a gas stripping zone or removed where only reactor 1 is separated from reactor 3 and riser 4. Reactor 3 can also alternatively be removed or placed at the bottom, top, or anywhere in between riser 4.

In certain embodiments, reactors 1 and 2 in FIG. 1 are operated as moving packed beds or fluidized beds. Gas stripping zones 7 and 8 and the gas stripping zone part of solids inventory and stripping zone 6 are operated as counter-current moving packed beds. In the case of a counter-current moving packed bed, the gas velocities within the reactor sections can be operated as high as several feet per second or higher so long as those velocities are below the minimum fluidization velocity of the particles used in the system while being maintained in moving packed bed flow. In the case of co-current gas-solids flow, the gas flow rate can be much higher.

Figure 2:
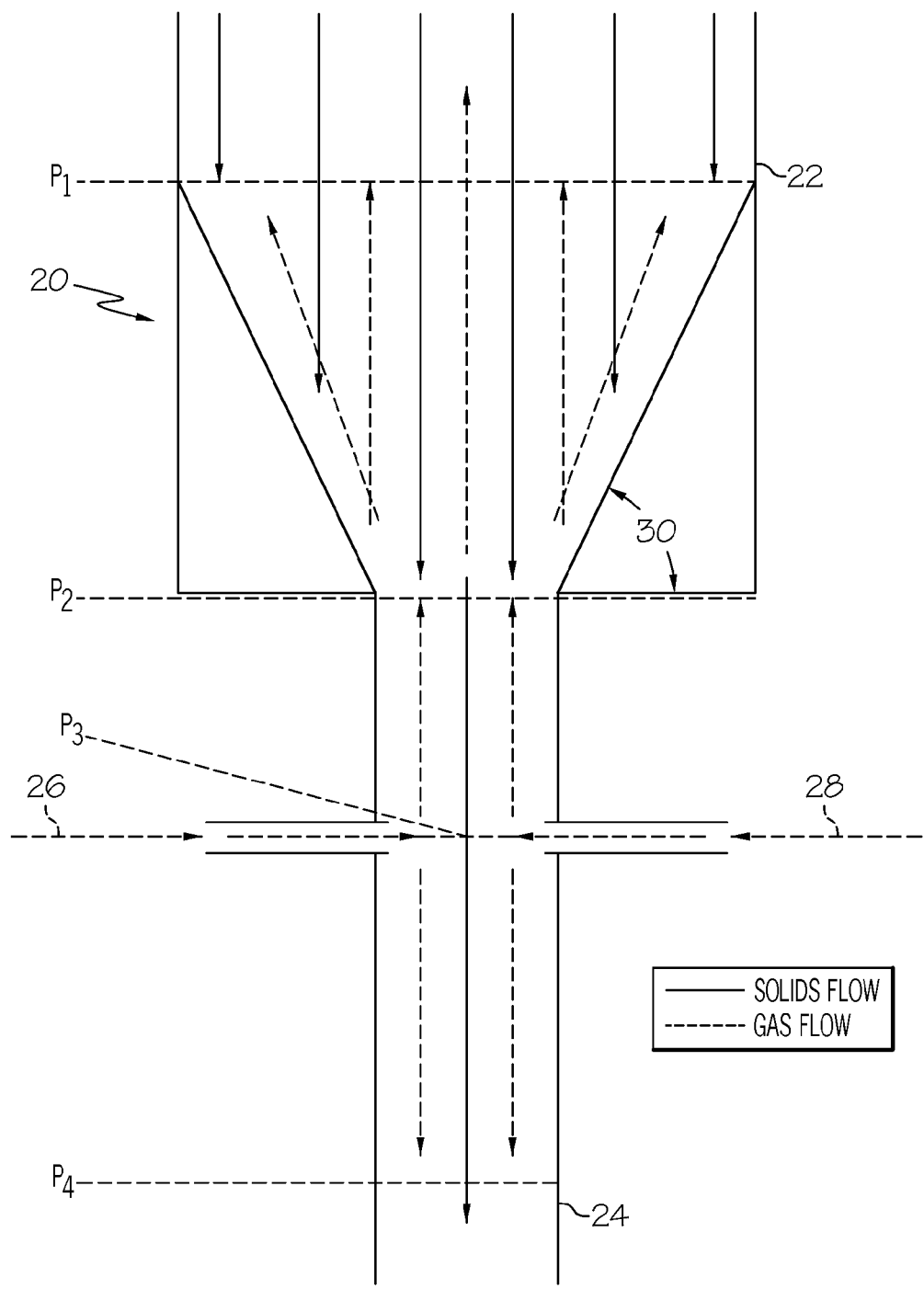
FIG. 2 is a schematic representation of one example of a stripping zone showing and angled solids outlet transition to a reduced internal diameter standpipe.

In certain embodiments, a zone seal standpipe 20 can be used as the gas stripping zone device. FIG. 2 schematically illustrates such a standpipe design. Standpipe 20 is in the form of a hollow conduit having a first end 22 communicating with the outlet of reactor 1 and a second end 24 communicating with the inlet of reactor 2. Stripping gas is injected into standpipe 20 at inlets 26, 28. Solids flow downwardly through reactor 1 of FIG. 1 and through standpipe 20. A stripping gas is injected into the standpipe so that the stripping gas can travel both upwards against solids flow and downwards as shown by the directional arrows. The stripping gas injection point can be anywhere along the height of the gas stripping zone. There can be either single or multiple injection points.

The stripping gas can also be injected into the lower portion of the reaction zone above as long as it is below the reactant gas injection point. To prevent processing gas contamination in either reactor, the pressure in the system at the height of the stripping gas injection point, $P_3$, should be greater than or equal to the top and bottom of the gas stripping zone, $P_2$ and $P_4$, respectively, to ensure that stripping gas flow splits. Pressure $P_3$ should also be greater than or equal to the pressure $P_2$ at the tapered transition of standpipe 20. In certain embodiments, it is desirable to maintain the stripping gas injection point at a higher location, for example in the bottom of the reactor zone above, because the downward movement of the stripping gas will not fluidize the solids whereas the upward movement of the gas will be at much lower velocity due to the larger cross-sectional area of the reactor zone compared with the stripping pipe.

Generally, to reduce the stripping gas flow requirements, the standpipe design as depicted in FIG. 2 has an inner diameter (ID) less than the reactor to which it connects. The tapered transition from the reactor ID to the reduced standpipe ID should be at an angle 30 such that all of the solids are in motion in the transition section. The angle of the transitional taper is dependent on the solids media shape and material properties as well as the material properties of the inner reactor wall. Generally, an angle of 30 degrees from the horizontal or greater is required to minimize axial movement.

Figure 3A:
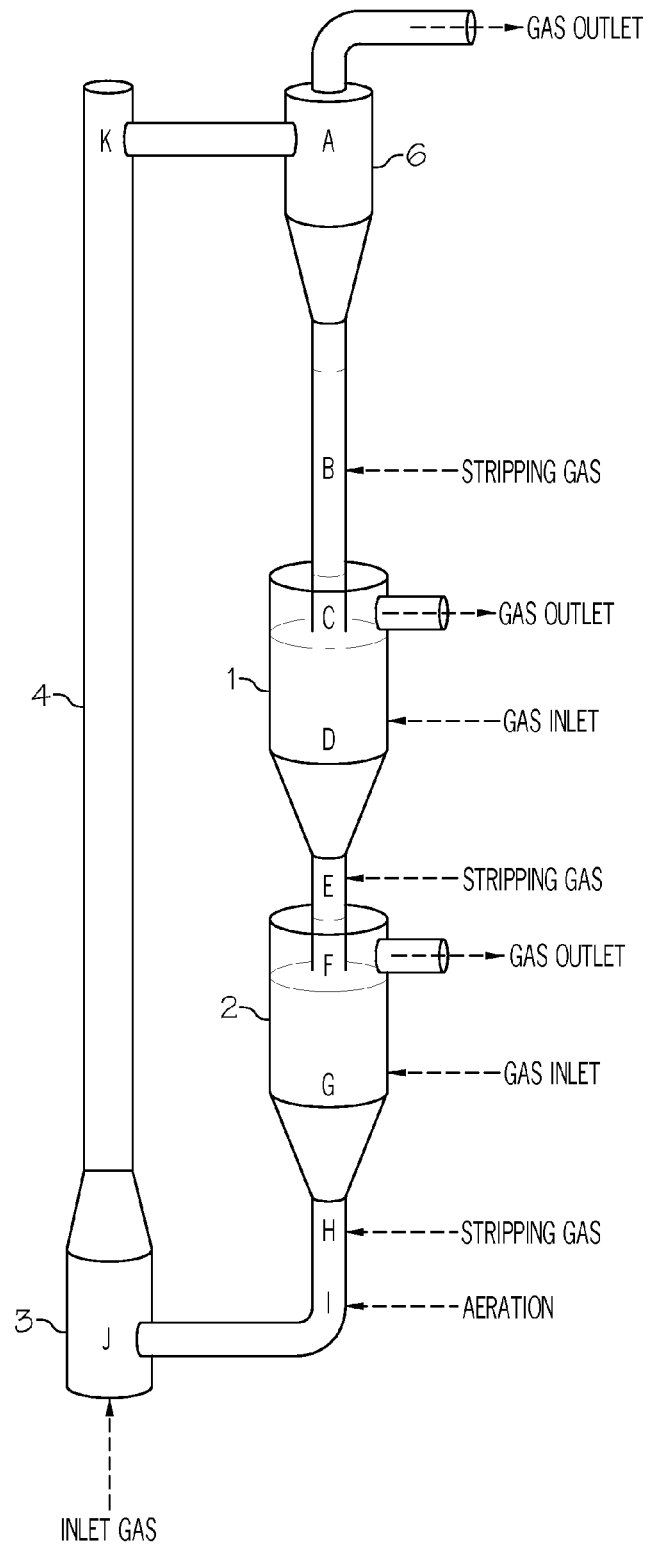
FIG. 3A is a schematic representation of another embodiment of the system.
Figure 3B:
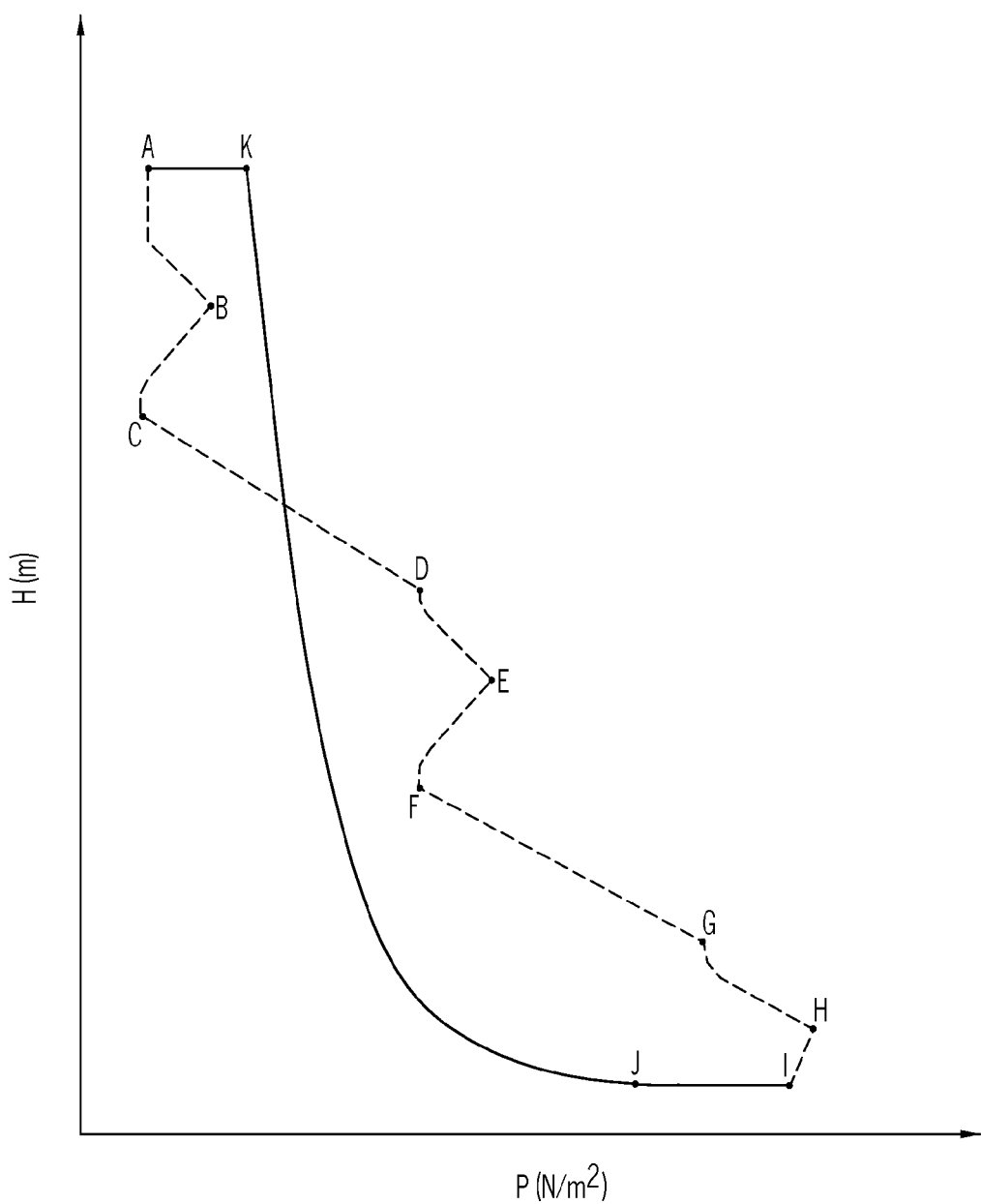
FIG. 3B is a graph of an exemplary pressure balance profile of the embodiment of FIG. 3A.

In one embodiment shown in FIGS. 3A and 3B, a solids circulation process is represented where reactors 1 and 2 and the gas stripping zones B and E therebetween are operated in a counter-current moving packed bed regime while reactor 3 and riser 4 are operated as turbulent fluidized and entrained bed systems, respectively. In packed bed operation, the differential pressure across the reactor is related to the bed height, gas velocity and composition, particle properties, operating pressure and temperature. Gas stripping zone seal standpipes are used in this embodiment where the ID of the standpipes is less than the ID of reactors 1 and 2.

An exemplary system pressure profile for this embodiment is provided in the graph of bed height versus pressure shown in FIG. 3B. From this figure, the system pressure at points A, C, and F are controlled by either inherent reactor design or through use of control devices placed on each gas outlet port.

The pressure differences between points C and D and points F and G of FIG. 3B represent the pressure drops across the moving packed bed reactors 1 and 2, respectively. The stripping gas injection at point B generates a local pressure greater than at point A in the solids recovery device 6 as well as at the reactor 1 gas outlet (point C) to prevent gas mixing from each reactor. The differential pressure profile between points B and C is first a linear pressure drop and is then curved as the standpipe penetrates into reactor 1. This is caused by the reduced gas velocity by the transitional gas discharge device at the bottom of the zone sealing pipe as explained in paragraph [0042] below. The pressure transition from B to A is due to the stripping gas flowing upwards in the moving packed bed section. The stripping gas injection at point E will generate a greater pressure at point E than at the reactant gas injection point into reactor 1, point D, as well as the gas outlet of reactor 2, point F, to prevent gas mixing. The curved pressure profile experienced from point E to D is due to the gradual decrease in velocity caused by the transition from a smaller diameter stripping standpipe to the larger diameter reactor 1 as the gas volumetric flow rate is constant through this transition. The pressure profile seen from point E to F is similar to the curve shown from point B to C.

Figure 4:
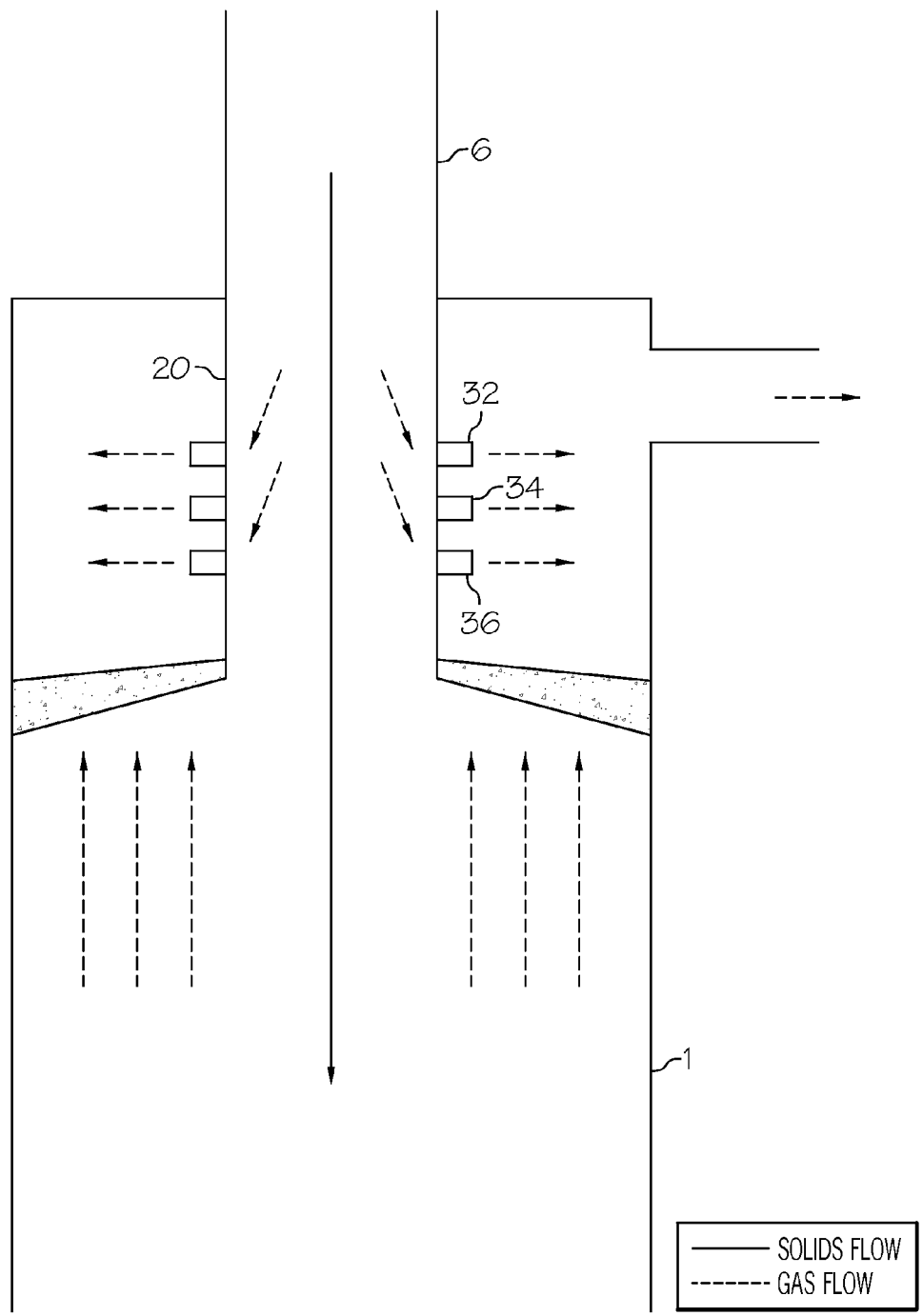
FIG. 4 is a schematic representation of one embodiment of a transitional gas discharge device in accordance with embodiments of the invention.

Referring to FIG. 4, a transitional gas discharge device 30 is schematically shown for gas discharge from the solids inventory device 6 to the freeboard area of reactor 1 connected to the standpipe 20. In certain embodiments where the standpipe has to not only strip but to dissipate pressure to balance the pressures in the system, the transitional gas discharge device 30 is comprised of a number of porous muffler filters 32, 34, 36 distributed on the bottom section of the standpipe dip-leg inside the reactor. The transitional gas discharge device prevents local solids fluidization at the interface between the smaller ID standpipe opening and the larger ID reactor when dissipating pressure over the standpipe. Local fluidization at this interface can cause controllability problems in the system which can affect the pressure imbalance within the standpipe damaging the effectiveness of the zone gas seal.

The multiple porous muffler filters in the transitional gas discharge device serve as gas outlets to gradually discharge the gas coming from the standpipe to the freeboard area of the reactor. As a result, the reduced gas velocity through the standpipe-reactor vessel interface is not sufficient for local fluidization to occur. The filter size, pore size, number, and distribution of the muffler filters can be determined by the size of the standpipe, gas flow rate in the standpipe, particle parties, cost, and other properties of the like in the system. The transitional gas discharge device can be applied to one or more the places where a standpipe is connected by a reactor in the reactor system. Alternatively, a pipe that is made of a screen can also be used. The screen retains the solids while allowing gases to flow through. In yet another embodiment, openings are made through the wall of the pipe. The hole is angled upward to prevent solids from flowing out while allowing gas to flow through.

The transitional discharge device 30 shown in FIG. 4 gradually dissipates the gas within the gas stripping standpipe into the freeboard of the reactor. Alternatively to the muffler design described above, the transitional gas discharge device can be a distribution of straight or angled slits, holes, or tubing attached to the standpipe dip-leg within the reactor. Additional alternative designs can be used to generate gradual gas dissipation.

Figure 5A:
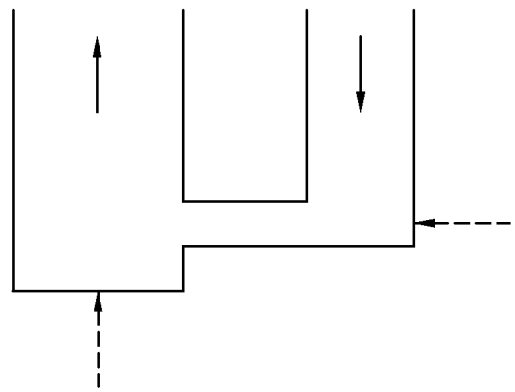
FIG. 5 is a schematic representation of non-mechanical sealing valves in accordance with embodiments of the invention, where FIG. 5(*a*) depicts an L-valve, FIG. 5(*b*) depicts a J-valve, and FIG. 5(*c*) depicts an H-valve.
Figure 5B:
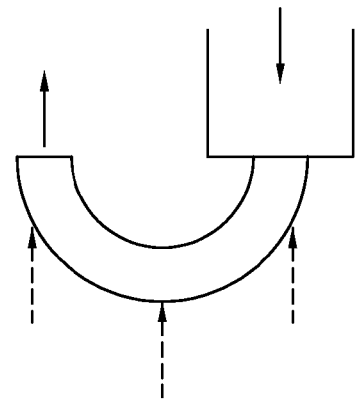
Figure 5C:
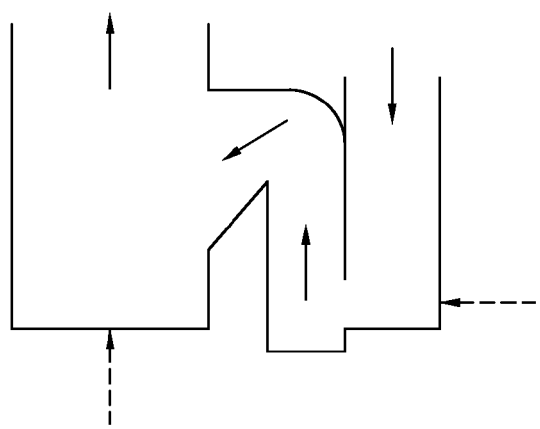

Referring back to FIG. 1, in the reactor system, the solids circulation rate is controlled by a solids circulation device 9 installed between the standpipe and reactor 3/riser 4. The solids circulation control device has two functions in the process: controlling the solids circulation rate; and preventing gas mixing between Reactor 2 and Reactor 3. A non-mechanical valve such as, for example, an L-valve, a J-valve, or an H-valve as schematically illustrated in FIG. 5 can be used as the solids circulation device to control the solids circulation rate and prevent gas mixing between the reactors. In addition, one or more of the aforementioned standpipes can also be replaced by any of the loop seal, reversed V-valve, L-valve, J-valve, or H-valves illustrated in FIG. 5.

In certain embodiments, the primary solids are separated from the gas stream in riser 4 by a solids recovery system 5 as shown in FIG. 1. The solids recovery device serves to remove abraded solids fines less than a specified size from the solids circulation process while allowing the solids greater than the cutoff size to be recycled into the solids inventory and gas stripping Zone 6. By reducing the amount of abraded solids within the system, the chances of reactor plugging and pressure drop variation due to the accumulation of fine powders in the reactor sections can be mitigated. A cyclone or drum can be used as the solids recovery device. Other types of solids recovery devices that are known to one of ordinary skill in the art to separate larger particles from smaller particles can also be used. Any abraded solids fines within gas stream 14 can be removed using a filter element, secondary cyclone, or a combination thereof as explained below. In certain embodiments, the solids collected from gas outlet stream 14 can be reprocessed and reused in the reactor system.

Figure 6:
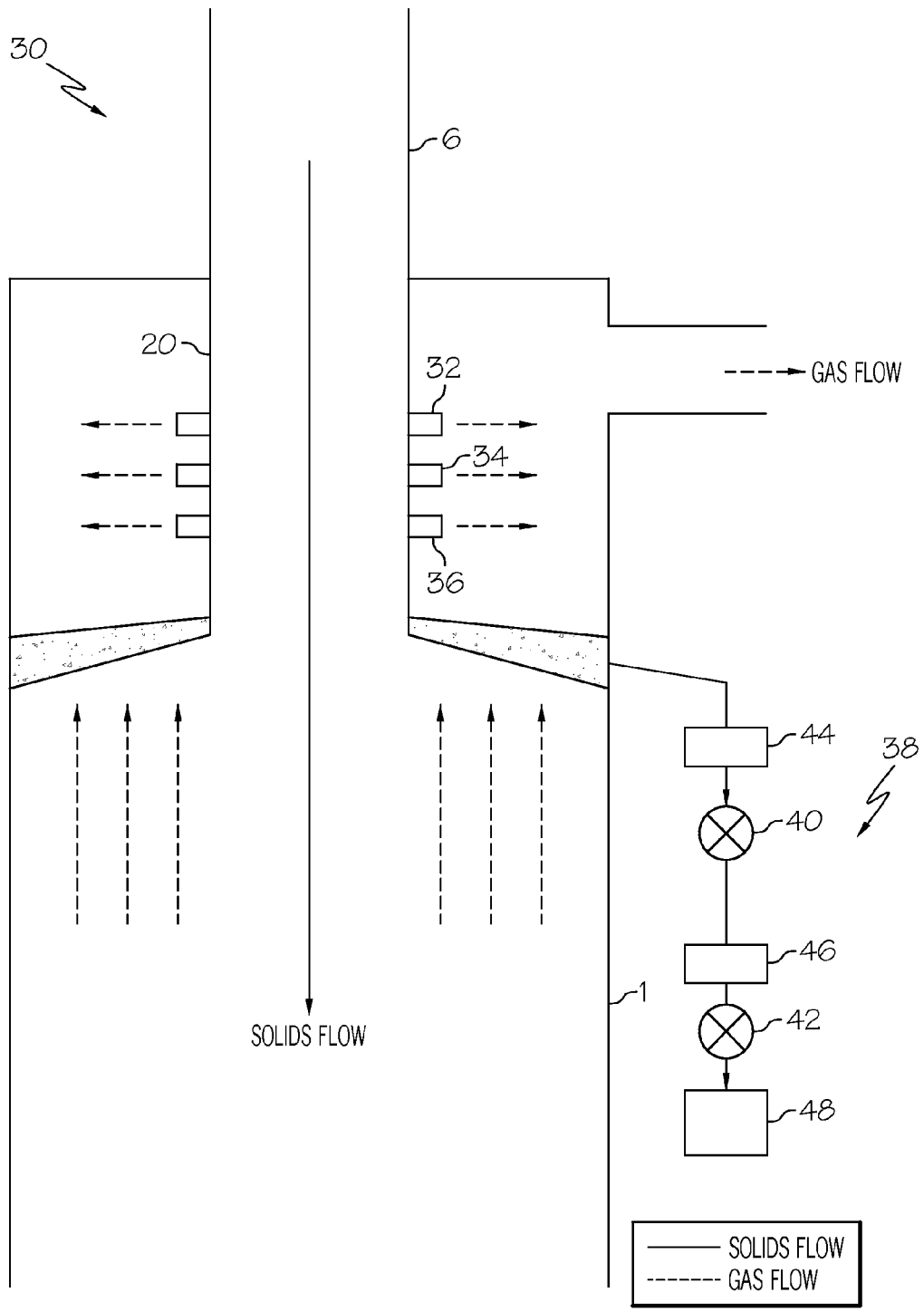
FIG. 6 is a schematic representation of one embodiment of a fines discharge device in accordance with embodiments of the invention.

Referring to FIG. 6, a fines discharge device 38 is schematically shown. The fines discharge device is integrated with the reactor 1 to remove solids fines accumulated at the bed surface in the reactor. Fine powders which form due to particle attrition need to be discharged from the system to maintain the system at a steady state and to avoid bed plugging. Discharge of fine powders through the fines discharge device 38 can avoid significant entrainment of fine powders in the freeboard area of reactor 1. Other types of fines discharge devices that are known to one of ordinary skill in the art can also be used. The fines discharge device shown in FIG. 6 comprises collection vessels 44, 46, and 48 and first and second valves 40, 42 that act as a lock hopper when the reactor system is operated at elevated pressure. The discharge point is at the thin layer of accumulated fine powders on the wall of reactor 1. Alternatively, multiple fine discharge devices can be introduced along the circumference of the thin fine powder layer on the wall of the reactor to achieve a high efficiency for fines discharge. The fines discharge device can also be integrated at other locations such as Reactor 2 shown in FIG. 1 in the reactor system.

Figure 7:
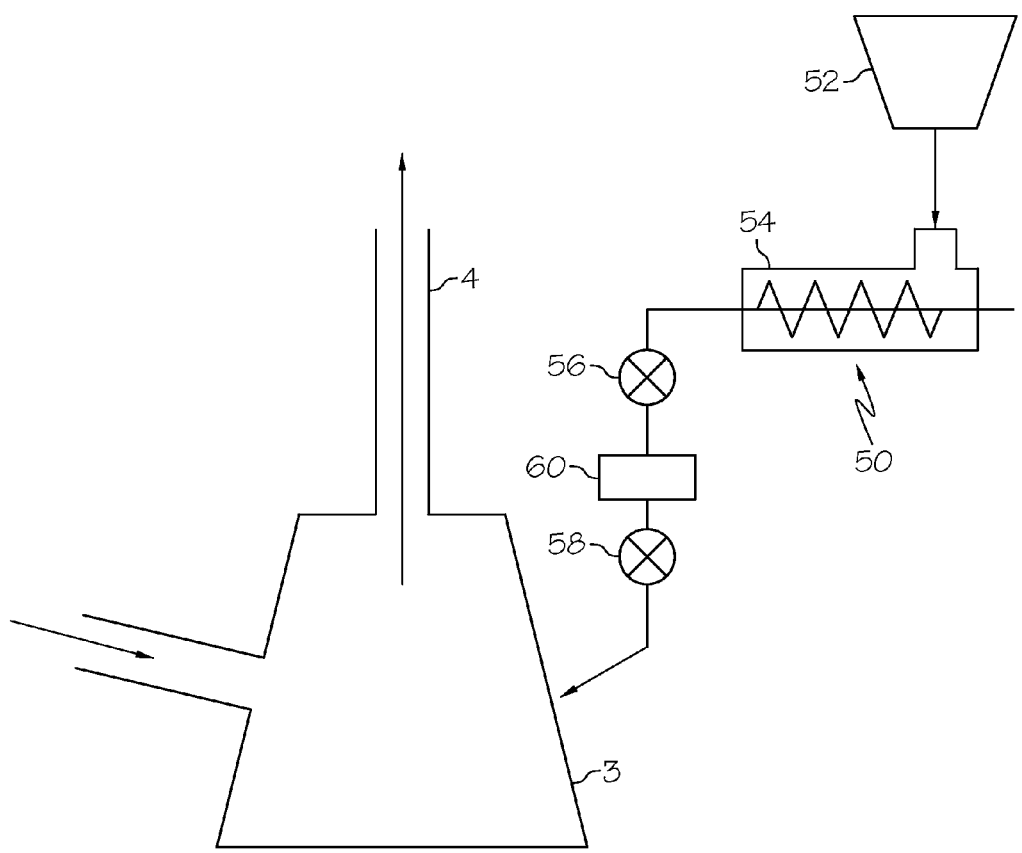
FIG. 7 is a schematic representation of one embodiment of a solids makeup device and its integration with a reactor in the system.

In certain embodiments, the reactor system is operated with relatively large particles, pellets, or agglomerates. The large particles may attrit, and the fines are removed from the system. Therefore, a particle makeup device is often installed in the reactor system. FIG. 7 illustrates schematically one embodiment of a particle makeup device 50. The particle make up device generally comprises a solids inventory vessel 52, a solids metering/flow control device 54, and first and second valves 56, 58 that act as a lock hopper 60 when the reactor system is operated at elevated pressure. Other types of solids makeup devices that are known to one of ordinary skill in the art can also be used. With the arrangement illustrated in FIG. 7, particle makeup device 50 is integrated with reactor 3 of FIG. 1 in which the makeup solids are immediately fluidized after entering the reactor. Alternatively, the makeup solids can be introduced at the solids inventory and stripping zone 6 of FIG. 1, or any other location on the reactor system. The solids makeup device is often interlinked with a bed height control device such that the overall solids inventory within the reactor system is maintained within a desired range.

In certain embodiments, the fines resulting from attrition are purged from the reactor system and collected for reprocessing. The purpose of reprocessing is to collect the fines and to re-form those fines into particles having the desired size, shape, strength, and density for reuse in the reactor system. The reprocessing device can either be integrated into or separate from the reactor system. Methods for reprocessing the fines may include, but are not limited to, extrusion, granulation, and pressurization methods such as pelletization.

In certain embodiments, particulate removal devices are installed on one or more of the gaseous outlets to remove the fines. In an exemplary embodiment, a secondary particulate separation device is installed downstream of the solids recovery device 5 on port 14 as shown in FIG. 1. The secondary particulate separation device can be a cyclone, filter, bag house, electrostatic precipitator or any other particulate separation device that is known to one of ordinary skill of the art. In certain embodiments, the fine solids removed from the particulate removal device are recovered for further processing and reuse.

Pressure control devices may be installed on one or more of the gaseous outlets. In certain embodiments, a pressure control valve is installed in series with a back pressure regulator to maintain the pressure of the reactor system and, adjust the gaseous outlet pressure when necessary. The back-pressure regulator is used to build up the majority of the pressure, whereas the pressure control valve is adjusted to achieve desired pressure distributions within the reactor system.

In certain embodiments, one or more burners (not shown) are used to assist the start up of the reactor system. The burner(s) can be installed in one or more of the reactors. The fuel for the burners may include, but are not limited to, propane, methane, and butane. The burners heat up the gas and solids which circulate within the reactor system, thereby increasing the temperature of the reactor system. In other embodiments, the burners are used during normal reactor operation to provide heat to the reactors. In other embodiments, fuel gases are directly injected to one or more of the reactors in a controlled manner. The fuel gases injected are combusted within the reactors to generate heat.

Figure 8:
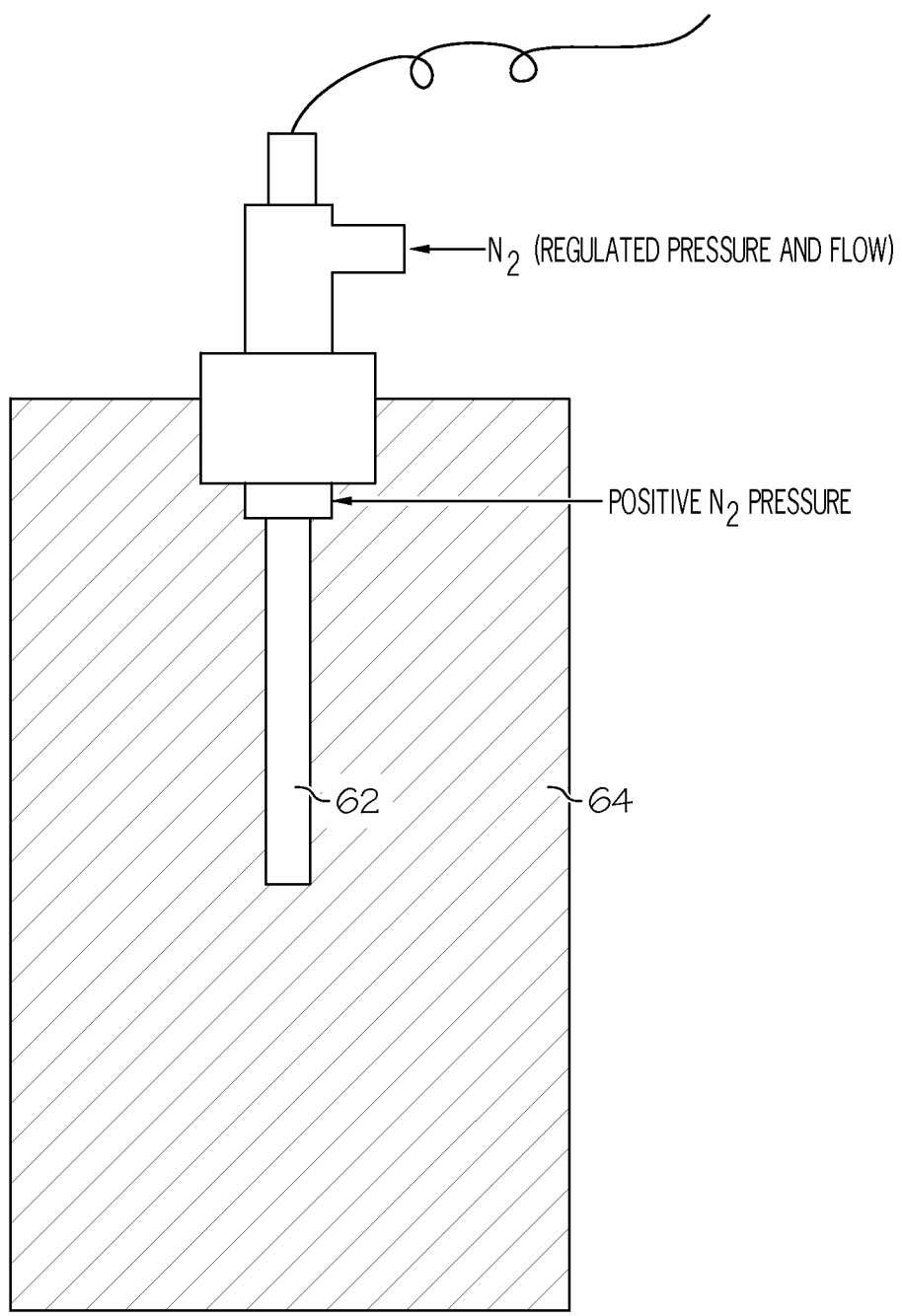
FIG. 8 is a schematic representation of one embodiment of an electric guard heater suitable for use in the invention.

In certain embodiments, the reactor system is operated under elevated temperature and a refractory lining is used inside one or more reactors to prevent heat loss. In yet other embodiments where a refractory lining alone cannot provide adequate insulation, a guard heater and/or a heating medium is used to further reduce the heat loss or to increase the temperature of the reactors. As shown schematically in FIG. 8, the heating medium can be an inert gas such as $N_2$, which is preheated outside of the reactor and then introduced into a zone that is located between the reactor outer and inner walls. Alternatively, the wall can be directly heated with electric heaters. An example of an exemplary heater design is shown in FIG. 8. As can be seen, the heater 62 is embedded into the refractory material 64 between the inner and outer walls of the reactor (not shown). Inert gases such as $N_2$ can be optionally injected, at a steady rate and a pressure slightly higher than the operating pressure of the reactor, around the heater to prevent the reactants from approaching the guard heater.

Figure 9:
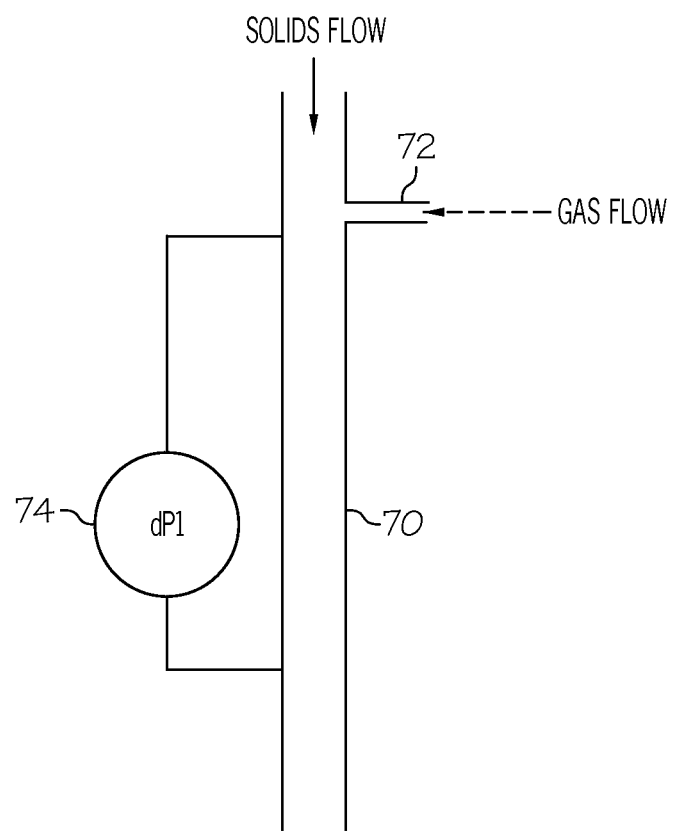
FIG. 9 is a schematic representation of one embodiment of a solids flow measurement device suitable for use in the invention.

Referring to FIG. 9, a solids flux measurement device for the gas solids reactor system is schematically shown. The solids flux measurement device comprises a standpipe 70 with a gas inlet 72 on the side of the standpipe. The top and bottom of the standpipe are connected with the main solids circulation loop within the reactor system. In certain embodiments, the standpipe can serve as a gas stripping zone as exemplified by gas stripping zones 7 and 8 of FIG. 1. A differential pressure-monitoring instrument 74, such as a differential pressure transducer, is installed on the standpipe to measure the differential pressure (dP1) between an arbitrary section of the standpipe at and/or below the gas inlet.

In order to measure the solids circulation rate, pressure control devices installed on the gaseous outlets of the immediately adjacent reactors are adjusted such that dP1 is zero. Then, a tracer gas is gradually introduced to the standpipe gas inlet. The maximum flow rate of the tracer gas before it can be detected in the zone above the gas injection point is then determined. This flow rate is finally translated to the interstitial gas velocity within the standpipe by adjusting it with standpipe cross-sectional area, voidage, and temperature and pressure. Such an interstitial gas velocity is equal to the real velocity of the solids within the pipe and is used to determine the solids circulation rate within the gas solid reactor system. In another configuration, the amount of tracer gas flowing down through the pipe is determined through gas analysis equipment and methods. This value is again used to calculate the interstitial gas velocity and the real velocity of the solids within the pipe. In yet another configuration, the amount of gas flowing downwards is determined by the minimum amount of stripping gas needed in order to provide a complete seal between the reactors. In yet another embodiment, dP1 need not be zero as long as the relationship between the pressure drop and relative velocity between the gas and solids is obtained through prior experiments and/or calculations Referring to FIG. 10, an alternative solids flow rate measurement device 80 is schematically shown. The solids flow rate measurement device is installed below the solids recovery device 5 of FIG. 1 and comprises a pot 82 and a solids flow control device 84 similar to device 9 in FIG. 1. The pot and the solids flow control device are installed in series with the pot placed on the top. Bed height monitoring devices are installed on the pot to monitor at least two levels (denoted as level 1 and level 2) within the pot. Under normal operating conditions, the solids flow control device is operated such that no solids are accumulated in the pot. This is usually achieved through high aeration gas velocity.

Figure 10:
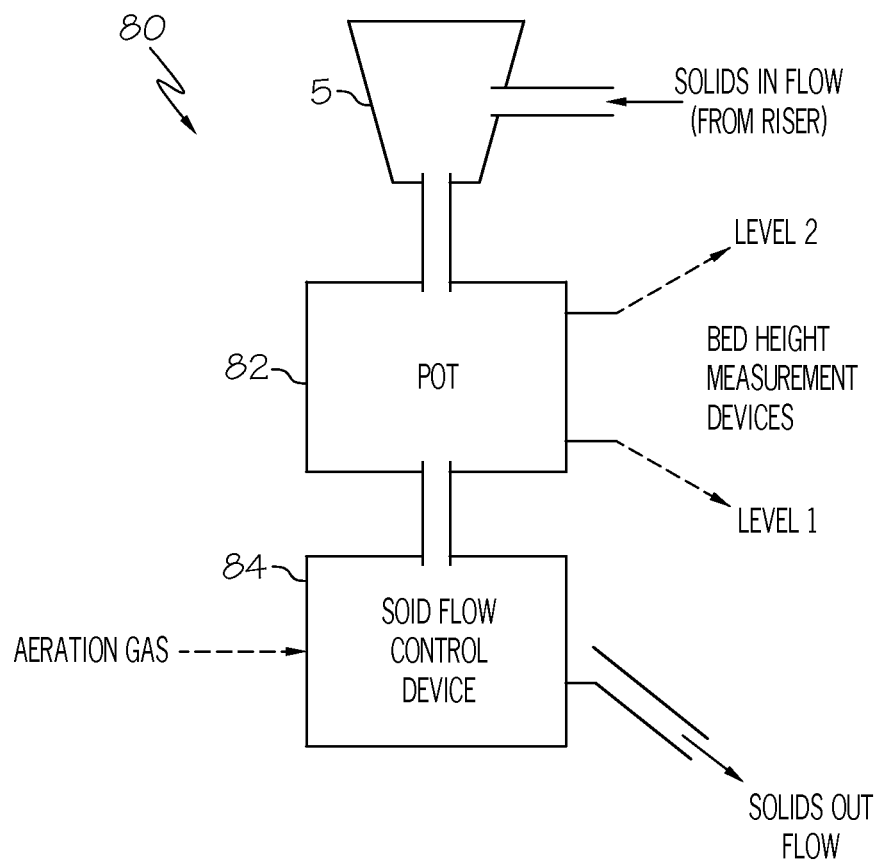
FIG. 10 is a schematic representation of an alternative embodiment of a solids flow measurement device suitable for use in the invention.

In order to measure the solids circulation rate, the solids flow rate through the solids flow control device is adjusted to zero. The time interval required for the solids to accumulate from level 1 to level 2 in the pot is then determined. The solids flow rate within the reactor system is then calculated by the time interval, the bulk density of the solids, and the volume between level 1 and level 2 of the pot. After the measurement is made, the solids flow control device is adjusted back to normal operating conditions. Referring back to device 6 of FIG. 1, in a design when the solids flow rate measurement device shown in FIG. 10 is not needed, device 6 is used to maintain the solids inventory within the reactor system. In an alternative design when the solids flow rate measurement device shown in FIG. 10 is included, the solids flow measurement device is integrated upstream of device 6. In such a configuration, device 6 is used to store the excess solids for the reactor system.

Referring to FIG. 11, an alternative design of reactor 3 of FIG. 1 is illustrated. Reactor 3 is a fluidized bed reactor. The fluidization regime of reactor 3 may include, but is not limited to, a bubbling fluidization regime, a turbulent fluidization regime, and a slugging regime. The reaction zone in reactor 3 generally comprises two sections, a main reactor section 90 and a transition section 92. The transition section 92 is often a tapered section with the top portion connected to the riser 4 inlet and the bottom portion connected to the main reactor section outlet. Solids flow into the main reactor section and then flow out of the transition section to riser 4. The main reactor section can be rectangular or cylindrical with uniform characteristic length.

Alternatively, a tapered main reactor section with larger cross-sectional area on the top can be used to reduce slugging. In yet another embodiment, internals are added to the main reactor section to further reduce slugging. Gas to fluidize and entrain particles in the reactor 3 comes from two gas sources. A small amount of gas may be introduced from the distributor at the bottom of reactor 3 to maintain the particles at minimum fluidization condition. A larger amount of gas may be introduced from several vertical nozzles above the solids charge pot in reactor 3 to achieve a turbulent fluidization regime in the reactor and provide enough gas to entrain particles to the riser.

Bed height monitoring devices may be installed at several locations in the system to ensure the solids bed height is sufficient for proper pressure balancing and/or to determine solids plugging issues. In certain embodiments, a capacitance-based bed height monitoring system can be used. FIG. 12 illustrates a capacitance sensor design for high temperature operation. In this figure, the capacitance sensor comprises a conductive plate 96 embedded within a nonconductive material 98. The insulated plate is suspended within the reactor as shown. A conductive lead 99 is connected to the plate and penetrates through the nonconductive cover and the reactor wall. An electrically insulating sleeve 102 covers the extended lead as it penetrates through the reactor wall. The capacitance reading is dependent on the solids concentration between the two capacitance sensors.

Referring now to FIG. 13, one embodiment for carrying out chemical looping reactions is illustrated schematically. In this embodiment, iron oxide containing particles are circulated within the reactor loop to convert a carbonaceous fuel into hydrogen, electricity, and/or heat. The system shown in FIG. 13 includes three reaction zones. The overall reaction scheme in each zone is summarized below.

ZONE 1 $C_xH_yO_z + Fe_2O_3 \rightarrow CO_2 + H_2O + Fe/FeO$

ZONE 2 $H_2O + Fe \rightarrow Fe_3O_4 + H_2$

ZONE 3 $O_2 + Fe_3O_4 \rightarrow Fe_2O_3 + Heat$

Carbonaceous fuel is injected at the bottom of reactor 1, termed reducer, where it reacts counter-currently with $Fe_2O_3$ containing particles to generate a $CO_2$ and $H_2O$ rich gas stream. The $Fe_2O_3$ containing particles within reactor 1 are reduced to particles containing metallic iron. The metallic iron containing particles are transported to reactor 2, termed oxidizer, via a standpipe. A gas seal is provided through the injection of inert gases and/or steam into the standpipe. In the second reaction zone, the metallic iron containing particles react with steam, counter-currently, to generate a hydrogen rich gas stream. The metallic iron containing particles are partially regenerated to FeO and/or $Fe_3O_4$ containing particles. The partially regenerated particles from reactor 2 are transported to the third reaction zone, reactor 3, termed combustor, through a standpipe followed by an L-valve as shown.

Inert gases and/or steam can be injected into the standpipe as stripping gas. The L-valve controls the global solids circulation rate. In reactor 3 the partially regenerated particles react with an oxygen containing gas such as $O_2$ and/or air. Heat is released from the reaction, which can be utilized for power generation. Also in reactor 3, the partially regenerated particles are further oxidized to $Fe_2O_3$ containing particles. These particles are transferred back to reactor 1 via riser 4, particulate separator, POT, and standpipes which are installed in the loop. Alternatively, a portion of the L-Valve gas, which can be an inert gas, steam, oxygen, and/or air, may be used to provide gas stripping. In yet another configuration, reactor 2 can be bypassed. In such a configuration, the metallic iron containing particles are directly transferred to reactor 3 (combustor) for heat/power generation.

Referring back to reactor 1, reactor 2, and the standpipe between them, in one configuration, $Fe_2O_3$ containing particles react with gaseous fuels which are directly introduced or produced from the partial conversion of solid fuels in a countercurrent manner. In the case when gaseous fuels are directly injected, they should be injected at the lower section of reactor 1. The preferred injection location for the gaseous fuels is in the tapered section near the bottom of the reactor 1. In the case where solids fuels are introduced, they can be injected practically anywhere into reactor 1. A preferred injection location can be either at the tapered section or in the standpipe. In certain embodiments, the solid fuel is fluidized within the reactor 1 until it is at least partially converted. Before exiting reactor 1, the iron phase in the $Fe_2O_3$ containing particles is reduced principally to an oxidation state that is comparable to or lower than Wustite. These particles are then passed through a standpipe where an inert gas such as $N_2$ and/or steam is introduced. The stripping gas flow rate is typically less than 15% of the overall product gas flow rate exiting reactor 1. The gaseous product preferably contains at least 75% (by mole) of $CO_2$ and $H_2O$ combined.

Referring back to reactor 2, the standpipe, and L-valve below, the reduced Fe/FeO containing particles enter reactor 2 from the gas stripping standpipe between reactors 1 and 2. In a preferred configuration, reduced iron containing particles react directly with steam injected in the lower section of the reactor. The steam travels upward against the flow of solids in a counter-current manner. The preferred injection location for the steam is in the taper section near the bottom of reactor 2. The gaseous product from reactor 2 gas outlet contains at least 75% (by mole) $H_2$ and $H_2O$ combined. Before exiting reactor 2, the iron phase in the iron containing particles is partially oxidized to an oxidation state that is less than or comparable to Magnetite. As discussed above, the L-valve below reactor 2 controls the global solids flow rate.

An aeration gas is typically injected in the vertical section of the L-valve where by adjusting the aeration gas flow, the global solids flow can be controlled. The preferred aeration gas injection location is equal to or greater than two times the length of the inner pipe diameter above the bottom of the L-valve. The gas stripping standpipe above the L-valve is used to prevent gas mixing between reactors 2 and 3 as well as providing a pressure boundary for proper system operation. The aeration gas used in the L-valve may also serve as a gas stripping zone for the two reactors that it connects depending on the operating conditions and pressure distribution. Alternatively, a separate stripping gas stream can be injected at a location above the aeration gas injection point. Further details on the pressure boundaries and distribution are provided below. The gas flow rate into the standpipe below reactor 2 is typically less than 15% of the overall product as flow. In yet another configuration, $CO_2$ or a mixture of $CO_2$ and $H_2O$, are used in reactor 2 to partially oxidize the iron containing particles from reactor 1. In such a configuration, the gaseous product from reactor 2 also contains CO.

Referring back to reactor 3, riser 4, the particle separator, and POT, the partially oxidized iron containing particles enter reactor 3 (combustor), from the L-valve. In a preferred configuration, the partially oxidized iron containing particles react directly with air injected from the lower section of the reactor. As discussed above, air may be used to fluidize and entrain particles in reactor 3 from a single, two, or even more gas sources. When two gas sources are used, a small amount of gas is introduced from the bottom of reactor 3 to maintain the particles at or above minimum fluidization conditions. Typically, a large amount of gas is introduced from several vertical nozzles above the solids charge pot in reactor 3 to achieve a turbulent fluidization regime in the reactor and provide enough gas to entrain particles to the riser 4. Before exiting reactor 3, the iron phase in the iron containing particles is oxidized to $Fe_2O_3$ containing particles.

Burners can be installed in reactor 3 to assist the startup of the reactor system. Typically, propane, methane, or like fuels, can be used as the fuel for the burners. The burners provide heat to the gas and solids within reactor 3. The reactor vessel typically has a larger ID than the riser connected above to generate a turbulent fluidized bed operating regime for increasing solids holdup. The tapered transitional connection from reactor 3 to the riser 4 is similar to a frustum like shape. The cross-sectional area of the taper decreases with height and causes an increase in the gas velocity to entrain particles to the riser from reactor 3. The oxidized iron containing particles are carried to the solids recovery device 5 at the top of the system through riser 4. As discussed above, a cyclone or drum may be used as the particle separator for solids recovery to separate solids larger than a specified cutoff size from the gas-particle mixture from the riser. The abraded solids fines within riser gas outlet are collected using a secondary cyclone and reused in the reactor system. The larger oxidized iron containing particles recovered from the particle separator enter the pot/receiver which is the top part of the solids inventory and gas stripping zone 6 above reactor 1. The pot serves as a solids inventory to maintain reactor 1 as a fully packed bed. As previously described, two sets of capacitance-based bed height monitoring systems are installed in the pot section to monitor the solids level in the pot. The bed height monitoring systems are combined with the solids makeup system to maintain the bed level at a predetermined position in the pot.

Referring generally to FIG. 13, pressure fluctuations can occur in the chemical looping system due to, for example, processing gas adjustment in any of the reactors, slugging effects experienced in reactor 3, loss of solids inventory in the pot section, a sudden change in gas flow, a sudden change in solids arrangement and distribution, and other like situations. Adjusting the pressure differential through the stripping pipe and/or regulating the stripping gas flow rates can maintain desired operating conditions. Desired or workable pressure distributions in the chemical looping process refer generally to a pressure distribution that allows each reactor to maintain its preferred operating regime (i.e., fluidized/entrained and/or counter-current moving packed bed) with minimal gas contamination between each reactor.

There are several control strategies to minimize the influence of pressure fluctuation in the system for efficient and robust operation. For example, one or more of the stripping sections can be used to absorb most, if not all, of the pressure fluctuations. Under such conditions, the stripping sections that absorb the pressure fluctuations are operated with fixed stripping gas flow rates without controlling their pressure differential. The flow rates of the stripping gas should be greater than or equal to the values under which the maximum pressure fluctuation within the system can be generated in these stripping sections. Pressure drops in the other stripping sections are maintained at a fixed or near fixed value. In certain embodiments, the nominal pressure drops (pressure drops in the absence of pressure fluctuation) in all the stripping sections are greater than the maximum local pressure fluctuation in the system. When the stripping gas is injected at the top or the bottom of the stripping zone, it is desirable, in certain cases, to maintain adequate gas flow towards both ends of the stripping zone because the pressure fluctuation can be bidirectional.

Referring back to the reduction reactions occurring in reactor 1, the reducer utilizes gaseous reducing fuels such as $CH_4$, $CO$, $H_2$, and the like to reduce the iron containing particles. The preferred reducing gas is synthesis gas produced from coal and/or biomass gasification. The reducer may also utilize solid carbonaceous fuels such as coal, tars, biomass, oil shale, oil sands, tar sand, wax, coke, and the like where the solid fuel is fluidized in reactor 1 for some time while being at least partially converted as described above. The fuel is preferably supplied to reactor 1 either in gaseous and/or particulate form.

The iron containing particles contain at least iron or iron oxide disposed on a ceramic support. Suitable ceramic composite particles for use in the system and process of the invention are described in Thomas et al., U.S. Pat. No. 7,767,191, and Fan et al., PCT Application No. WO2007/082089. Additionally, Fan et al., PCT Application WO2010/037011, describes methods to improve the performance and strength of the ceramic composite particles. The iron containing particle size is dependent the solids flow regimes within the reactor system. Typically, the size of the iron containing particles should be large enough such that the counter current moving packed bed flow is maintained in reactors 1 and 2 and solids fluidization/entrainment is achievable and practical in reactor 3. Thus, a preferred iron containing particle size is between about 200 µm and about 40 mm.

The invention claimed is:

1. A system for carrying out one or more chemical reactions comprising:
a first chemical reactor having an inlet and an outlet for particulate solids, said particulate solids forming a bed in said first reactor, said outlet including a transition zone which narrows the internal diameter of said first reactor, said first reactor including an inlet for a solid or gaseous reactant and an outlet for a process gas;
a second chemical reactor having an inlet and an outlet for particulate solids, said particulate solids forming a bed in said second reactor, said second reactor including an inlet for a solid or gaseous reactant and an outlet for a process gas;
a first gas stripping zone forming a non-mechanical seal between said first and second reactors comprising a conduit connecting said first reactor with said second reactor, said conduit including a first end communicating with the solids outlet of said first chemical reactor and a second end communicating with the solids inlet of said second reactor, said first end of said conduit including an inlet for a stripping gas located between said first and second ends, said first gas stripping zone adapted to prevent process gas from said first reactor from entering said second reactor while permitting said particulate solids to pass from said first reactor into said second reactor;
a third chemical reactor communicating with said second chemical reactor, said third reactor having an inlet and an outlet for particulate solids, said particulate solids forming a bed in said third reactor;
a riser section communicating with the particulate solids outlet of said third reactor, said riser section adapted to recirculate entrained solids to said first reactor, said third reactor further including a source of gas; and
a second gas stripping zone forming a non-mechanical seal between said second and third reactors comprising a conduit connecting said second reactor with said third reactor, said conduit including a first end communicating with the solids outlet of said second chemical reactor and a second end communicating with the solids inlet of said third reactor, said first end of said conduit including an inlet for a stripping gas located between said first and second ends said second gas stripping zone adapted to prevent process gas from said second reactor from entering said third reactor while permitting said particulate solids to pass from said second reactor into said third reactor.

2. A system as claimed in claim 1 in which said first gas stripping zone comprises a zone steal standpipe.

3. A system as claimed in claim 2 in which said zone seal standpipe includes a tapered section between said solids outlet of said first chemical reactor and said solids inlet of said second chemical reactor.

4. A system as claimed in claim 1 including a solids recovery device communicating with said riser section, said solids recovery device comprising a particulate separator for removing fine particulates from said system.

5. A system as claimed in claim 4 including a solids inventory device adapted to contain particulate solid particles, said solids inventory device communicating with said solids recovery device for receiving recovered particulate solids and communicating with said first chemical reactor for supplying particulate solids to said first reactor.

6. A system as claimed in claim 5 including a third gas stripping zone between said solids inventory device and said first reactor.

7. A system as claimed in claim 1 in which said first gas stripping zone comprises a standpipe forming a transitional gas discharge device, said standpipe having an end communicating with said first reactor, said end including a gas outlet communicating with said outlet for process gas in said first reactor for discharging gas from said standpipe.

8. A system as claimed in claim 7 in which said gas outlet in said gas outlet in said standpipe is selected from a plurality of porous filters, straight slits, angled silts, and holes.

9. A system as claimed in claim 7 including a fines discharge device positioned on the circumference of an inner wall of said first reactor.

10. A system as claimed in claim 3 including a solids circulation control device positioned between said second and third reactors and adapted to control the circulation rate of said particulate solids and to prevent gas mixing between said second and third reactors.

11. A system as claimed in claim 10 in which said solids circulation control device comprises a non-mechanical seal device selected from a standpipe, a loop seal, a V-valve, an L-valve, a J-valve, and an H-valve.

12. A system as claimed in claim 1 including a solid particulate bed height monitoring device positioned in said first reactor comprising a capacitance sensor.

13. A process for circulating gaseous and solid materials through a series of three chemical reactors comprising:

controlling the flow of solids and gases through each reactor such that process gases from one reactor are prevented from entering a different reactor while permitting solids to pass from one rector to another by positioning a stripping gas zone having first and second ends between said reactors and injecting a stripping gas into said zone between said first and second ends such that the gas pressure where stripping gas is injected is greater than or equal to the pressure at either end of said zone said stripping gas zone having a reduced cross sectional area as compared with said reactors to control solids flow between reactors; and recirculating entrained solids to one reactor through a riser communicating with a solids outlet of another reactor.

* * * * *